(12) United States Patent
Czarnecki et al.

(10) Patent No.: US 7,548,405 B2
(45) Date of Patent: Jun. 16, 2009

(54) SYSTEMS AND METHODS USING DIODES TO PROTECT ELECTRONIC DEVICES

(75) Inventors: Stanley W. Czarnecki, Palo Alto, CA (US); Icko E. T. Iben, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 11/614,003

(22) Filed: Dec. 20, 2006

(65) Prior Publication Data

US 2008/0151447 A1 Jun. 26, 2008

(51) Int. Cl.
*H02H 3/22* (2006.01)
*H02H 1/00* (2006.01)

(52) U.S. Cl. .................................... 361/111
(58) Field of Classification Search ................. 361/111

See application file for complete search history.

(56) References Cited

U.S. PATENT DOCUMENTS

| | | | | |
|---|---|---|---|---|
| 5,748,412 | A | 5/1998 | Murdock et al. | 360/113 |
| 6,972,933 | B1 | 12/2005 | Wada et al. | 360/323 |
| 7,086,058 | B2 * | 8/2006 | Luick | 718/102 |
| 2005/0141143 | A1 | 6/2005 | Ono et al. | 360/323 |
| 2005/0254158 | A1 | 11/2005 | Kuehne et al. | 360/67 |
| 2006/0044702 | A1 | 3/2006 | Ding et al. | 360/323 |
| 2006/0098350 | A1 | 5/2006 | Hamidi | 360/323 |
| 2006/0209482 | A1 * | 9/2006 | Scheffler | 361/93.1 |

* cited by examiner

*Primary Examiner*—Ronald W Leja
(74) *Attorney, Agent, or Firm*—Zilka-Kotab, PC

(57) ABSTRACT

A system for protecting an electronic device from an electrical event such as electrostatic discharge and other spurious events according to one embodiment of the present invention includes first and second leads adapted for passing an electric current through an electronic device, a first diode protection mechanism coupled to the leads such that the first diode protection mechanism is connected in parallel with the electronic device when the leads are coupled to the electronic device, and a second diode protection mechanism coupled in series with the electronic device when the leads are coupled to the electronic device.

20 Claims, 19 Drawing Sheets $R_{ED}$: Electronic Device
$V_{d1}$: Diode voltage
$R_{s1}$: Diode Series Resistance $R_{ED}$: Electronic Device
$V_{dj}$: Diode voltage, j =1 or 2
$R_{sj}$: Diode Series Resistance, j =1 or 2

SYSTEMS AND METHODS USING DIODES TO PROTECT ELECTRONIC DEVICES

FIELD OF THE INVENTION

The present invention relates to systems and methods for using diodes to protect electronic devices.

BACKGROUND OF THE INVENTION

Magnetic head-based systems have been widely accepted in the computer industry as a cost-effective form of data storage. Magnetoresistive (MR) sensors are particularly useful as read elements in heads (sensor), used to read magnetically stored data used in the data storage industry for high data recording densities. Three examples of MR materials used in the storage industry are anisotropic magnetoresistive (AMR), giant magnetoresistive (GMR), and tunnel junction magnetoresistive (TMR). MR and GMR sensors are deposited as small and thin multi-layered sheet resistors on a structural substrate. The sheet resistors can be coupled to external devices by contact to metal pads which are electrically connected to the sheet resistors. MR sensors provide a high output signal which is not directly related to the head velocity as in the case of inductive read heads.

To achieve the high aerial densities required by the data storage industry, the sensors are made with commensurately small dimensions. The smaller the dimensions, the more sensitive the thin sheet resistors become to damage from spurious current or voltage spike.

A major problem that is encountered during manufacturing, handling and use of MR sheet resistors as magnetic recording transducers is the buildup of electrostatic charges on the various elements of a head or other objects which come into contact with the sensors, particularly sensors of the thin film type, and the accompanying spurious discharge of the static electricity (ESD) thus generated. Static charges may be externally produced and accumulate on persons or instruments used for performing head manufacturing or testing procedures. These static charges may be discharged through the head causing excessive heating of the sensitive sensors which result in physical or magnetic damage to the sensors.

As described above, when a head is exposed to voltage or current inputs which are larger than that intended under normal operating conditions, the sensor and other parts of the head may be damaged. This sensitivity to electrical damage is particularly severe for MR read sensors because of their relatively small physical size. For example, an MR sensor used for high recording densities for magnetic tape media (order of 25 Mbytes/cm$^2$) are patterned as resistive sheets of MR and accompanying materials, and will have a combined thickness for the sensor sheets on the order of a few 100s of Angstroms (Å) with a width of 1 to 10 microns (µm) and a height on the order of 1 µm. Future products will use even smaller dimensions. The hard disk storage industry already uses heads with stripe heights and track widths of 0.2 µm or less. Discharge currents of tens of milliamps through such a small resistor can cause severe damage or complete destruction of the MR sensor. The nature of the damage which may be experienced by an MR sensor varies significantly, including complete destruction of the sensor via melting and evaporation, oxidation of materials at the tape bearing surface (TBS), generation of shorts via electrical breakdown, and milder forms of magnetic or physical damage in which the head performance may be degraded. Short time current or voltage pulses which cause extensive physical damage to a sensor are termed electrostatic discharge (ESD) pulses.

Prior solutions to ESD protection can be summarized into two types of approaches: 1) by using diode(s) and 2) by shorting out the sensor element. Both of these approaches have significant disadvantages. Electrically shorting out the MR sensors, by shorting the two ends of the sensor which connect to external devices provides the best possible ESD protection. However, approaches heretofore devised have required either semi-permanent shorting such as removable soldering or specialized and expensive removable components. Furthermore, once the shorts are removed, the MR sensors are susceptible to ESD damage.

In the diode approach, the diode is intended to remain in parallel with the sensor element during normal operation of the system. Simplistically, the diodes function by shunting the ESD current through the diode rather than the MR (sheet resistor) when the voltage across the diodes exceeds a given voltage ($V_{crit}$). Potential problems with the diode approach are: 1) drainage of current under normal operation degrading the sensor performance, 2) excessive weight of the diode package affecting mechanical motion of the tape head, 3) excessive cost of adding a multiplicity of diodes, 4) physically being able to fit a multiplicity of diodes onto a cable, and 5) space constraints within a small tape drive. Another issue is that when the voltage across the diode ($V_{diode}$) exceeds critical voltage, $V_{crit}$, and should be shunting current around the electronic device (ED), the resistance of the diodes can be of the order of 10 ohms. For a device resistance of 100 ohms, the device will shunt 10% of the current. If the current through the diodes is 200 mA, then the current through the device will be 20 mA. For sensitive GMR sensors with thin film layers and small stripe heights, currents of the order of 20 mA can damage the devices. Furthermore, the voltage across the ED will be (approximately) the critical voltage plus the diode current times the device resistance. For the above example, the voltage across the ED will be given by Ohm's law as 2 V. For many sensitive EDs used in the data storage industry, such as TMR sensors, the parts will be damaged with voltages as low as 0.5 to 1 V due to dielectric breakdown.

A need therefore exists for providing protection for electronic devices such as magnetic heads.

SUMMARY OF THE INVENTION

A system for protecting an electronic device from an electrical event such as electrostatic discharge and other spurious events according to one embodiment of the present invention includes first and second leads adapted for passing an electric current through an electronic device, a second diode protection mechanism coupled in series with the electronic device when the leads are coupled to the electronic device, and a first diode protection mechanism coupled to the leads such that the first diode protection mechanism is connected in parallel with the electronic device and the second diode protection mechanism when the leads are coupled to the electronic device.

A system for protecting an electronic device from an electrical event according to other aspects of the present invention which may be used when the electronic device to he protected is connected to leads, wires or cables, (here-to-for referred to as leads) which exhibit an inductive impedance between the end connected to the electronic device (proximal) and the end which is to be connected to external electronic devices (distal). A system according to one embodiment includes first and second leads adapted for passing an electric current through an electronic device, a first diode protection mechanism coupled to the leads such that the first diode protection mechanism is connected in parallel with the electronic device when the leads are coupled to the electronic device at a proximal location, and a second diode protection mechanism coupled to the leads such that the second diode is connected in parallel with the electronic device and positioned farther from the electronic device than the first diode protection mechanism at a distal location. One purpose of the second diode protection mechanism is for reducing the pulse width of an electrical event.

A system for protecting an electronic device from an electrical event according to yet another embodiment of the present invention includes first and second leads adapted for passing an electric current through an electronic device, a first diode protection mechanism coupled to the leads such that the first diode protection mechanism is connected in parallel with the electronic device when the leads are coupled to the electronic device, and a resistor mechanism coupled in series with the electronic device.

A method for selecting diode protection mechanisms for protecting an electronic device from an electrical event according to one embodiment includes selecting a first diode protection mechanism for connection in parallel with an electronic device, and selecting a second diode protection mechanism for connection in series with the electronic device, wherein the diode protection mechanisms are selected such that more current flows through the electronic device and the second diode protection mechanism when a current or voltage in an operating range (mid current) is applied to leads of the electronic device, and more current flows through the first diode protection mechanism when a current or voltage higher than the operating range is applied to the leads of the electronic device.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit, the inventive concepts claimed herein.

The present description discloses systems and methods for protecting components of an electronic device from an electrical event such as an ESD discharge. For ease of understanding, and to place the invention in a context, much of the following description describes the invention as embodied for use with a magnetoresistive (MR) sensor. It should thus be kept in mind that the inventive teachings herein also apply to other electronic devices.

It should also be noted that the various parts and components described for the various embodiments, as well as their characteristics, may be used in other embodiments to create each of the many possible combinations and permutations.

Figure 1:
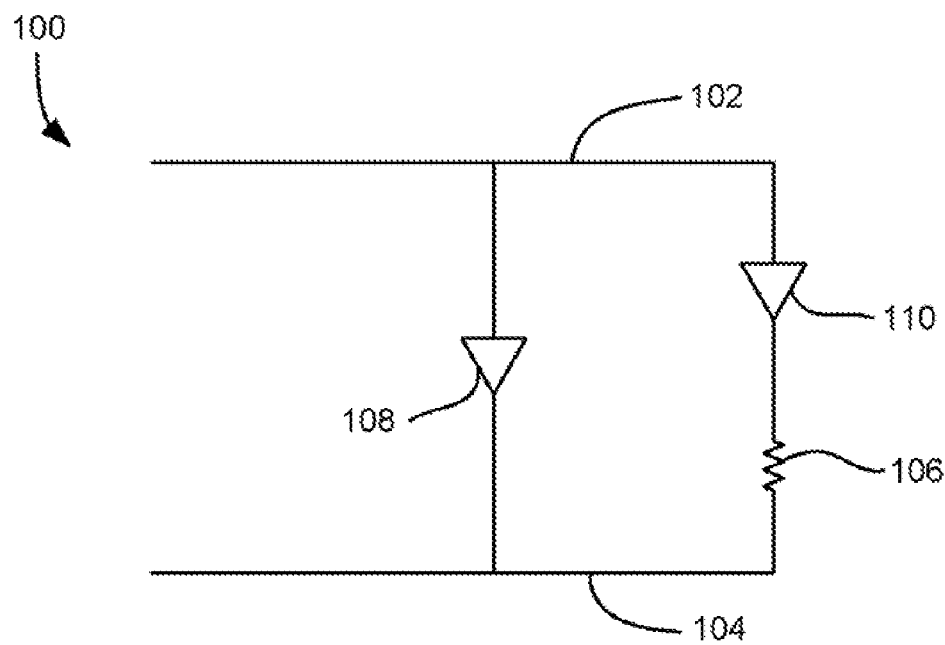
FIG. 1 is a diagram of a system for protecting an electronic device from an electrical event according to one embodiment of the present invention.

FIG. 1 illustrates one embodiment of a system 100 for protecting an electronic device from an electrical event. As shown, the system includes first and second leads, 102 and 104 respectively, adapted for passing an electric current through an electronic device 106 such as an MR sensor. A first diode protection mechanism 108 is coupled to the leads such that the first diode protection mechanism is connected in parallel with the electronic device when the leads are coupled to the electronic device. A second diode protection mechanism 110 is coupled in series with the electronic device when the leads are coupled to the electronic device. Where multiple electronic devices are present, one such system may be provided for each electronic device.

Figure 2:
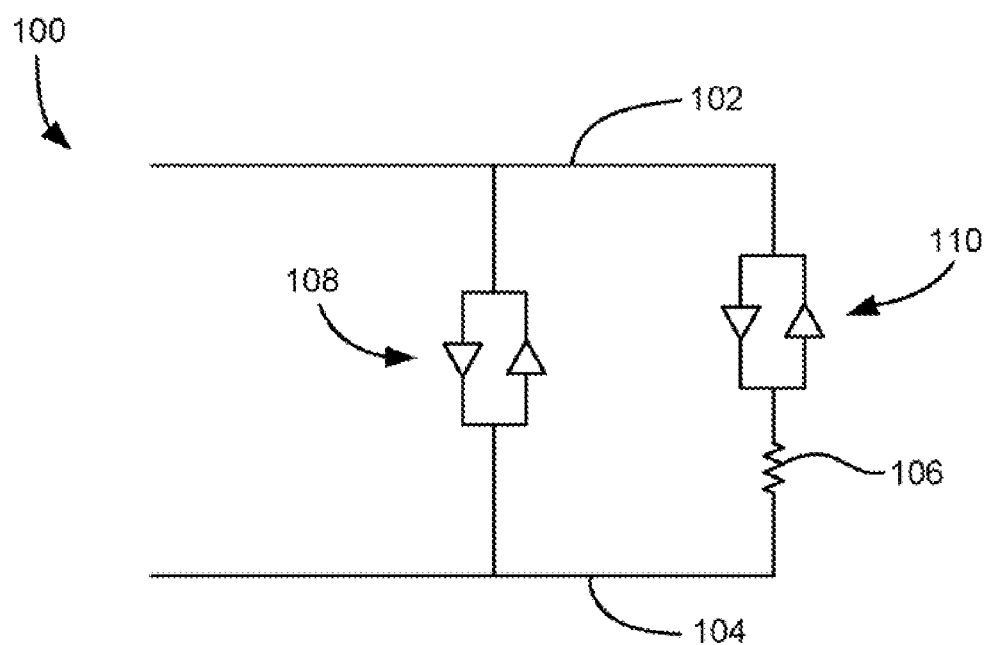
FIG. 2 is a diagram of a system for protecting an electronic device from an electrical event according to one embodiment of the present invention.

The diode protection mechanisms may each include only a single diode. If only one diode is used for the parallel diode, it is preferably chosen to be in the same polarity as the signal to the electronic device, as the signal voltage source might be a source of damage if used improperly (e.g., turned on prior to connecting to the device). Preferably, however, one or more of the diode protection mechanisms may include crossed diodes, as shown in FIG. 2. Crossed diodes indicates that the diodes are connected in parallel but with opposite polarities. Crossed diodes provide the advantage that an electrical event of either polarity which is initiated on either of the leads can be quickly shunted through the diodes connecting the two lead rather than passing through the device. In other words, the shunting is bi-directionally capable, passing current of both polarities.

A diode functions as the electronic version of a one-way valve. It allows electric current to flow in one direction when forward biased, but reduces or blocks it in the opposite direction when reverse biased. The current through the forward biased diode increases exponentially with the applied voltage. A forward biased diode's current-voltage, or I-V, characteristic can be approximated by three regions of operation: low, mid and high current regimes. Below a certain difference in potential between the two leads, the diode can be thought of as an open (substantially non-conductive) circuit (low-current regime). At some bias voltage ($V_{on}$), the current through the diode is comparable to the operational voltage of the ED. This is the mid-current regime. Finally, above some critical voltage ($V_{crit}$) the current through the diode is larger than the ED operating point and for small changes in the voltage across the diode, the current rises dramatically.

PN diodes, in general, have a turn on voltage ($V_{on}$) at about 0.6 to 0.8 V when forward biased. As will be seen later, PN diodes can be made to have a lower $V_{on}$. Schottky diodes, in general, a $V_{on}$ of about 0.3 to 0.4 V. However, the invention is not to be limited to these particular voltages, and may have higher or lower voltage characteristics. The diode protection mechanisms may utilize multiple diodes for protection which have substantially identical turn on voltages ($V_{on}$), or intentionally different turn on voltages. Preferred diodes have a fast response time. Preferably, the response time is less than about 20 nanoseconds, and ideally less than about 10, and even less than about 1 to 5, nanoseconds, to shunt the fast current pulse typical during an ESD event.

Figure 3:
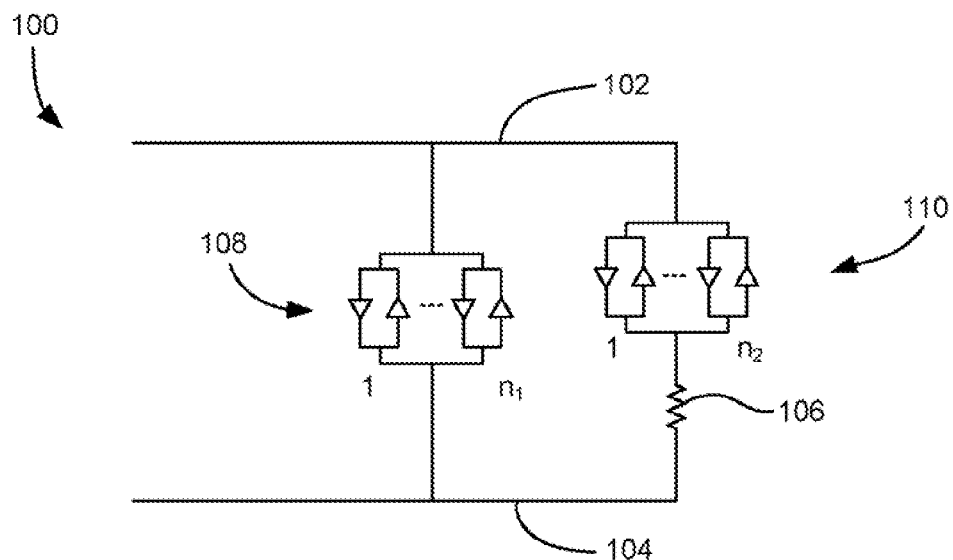
FIG. 3 is a diagram of a system for protecting an electronic device from an electrical event according to one embodiment of the present invention.

One aspect of diodes which limits their ability to protect an electronic device which is connected in parallel with the diode is the fact that diodes have an in series resistance, or an effective "on" resistance ($R_{on}$). The higher the value of $R_{on}$, the more current will pass through the parallel connected electronic device rather than being shunted through the diode. Referring to FIG. 3, one or more of the diode protection mechanisms 108, 110 may contain multiple sets, e.g., $n_1$ and $n_2$ sets, of diodes arranged in parallel. Placing several diodes in parallel with each other drops the "on" resistance ($R_{on}$) of the particular diode protection mechanism without changing $V_{crit}$. In more detail, a diode can be conceptually considered as a serial connection of an ideal diode and an in-series resistance. The higher the number of diodes which are connected in parallel with each other, the lower the series resistance of the set of diodes, and consequently, the more the ESD-induced current will flow through the set of diodes at a given applied voltage. This is beneficial when the diode or set of diodes are connected in parallel with an ED since the lower the effective series resistance of a diode for set thereof), the lower the current that will pass through the ED during an electrical event.

The number and/or characteristics of diodes in the diode protection mechanisms may be the same or different for each diode protection mechanism. By selecting the number of diodes in each diode protection mechanism, and/or by selecting diodes with different properties, the overall properties of the system can be tuned for a particular application. For example, the diode protection mechanism that is coupled in parallel with the ED to shunt current away from the ED during a high current event may include several diodes connected in parallel to drop the "on" resistance of the entire group of shunting diodes. During normal operation, the shunting diodes should be designed to shunt as little current as possible while the diode or group of diodes which are connected in series with the ED should become conductive so most of the current passes through the ED. To achieve the above results, the number of diodes used and/or the individual diodes and/or groups thereof may be tuned by variations in the diode characteristics such as carrier concentrations, dopant types, dopant levels, band gap levels, etc. Illustrative methods describing how to create a tuned system using combinations of diodes are described in more detail below.

In preferred embodiments, the properties of the diode protection mechanisms are such that more current flows through the electronic device and the second diode protection mechanism (in series with the ED) when a current or voltage in the operating range of the electronic device is passing through the leads, and more current flows through the first diode protection mechanism when a current or voltage higher than the operating range is passing through the leads. More information about how such systems are designed and configured is presented below.

Another aspect of an electrical event is the width of the electrical pulse, or its duration. In general, the wider the pulse, the lower the voltage or current required to damage an electronic device. Accordingly, reducing the width of the pulse is beneficial. The pulse width can be decreased by placing diodes at the input of the cable (distal location from the ED) where it attaches to external electronic devices, and thus prior to the cable inductance.

Figure 4:
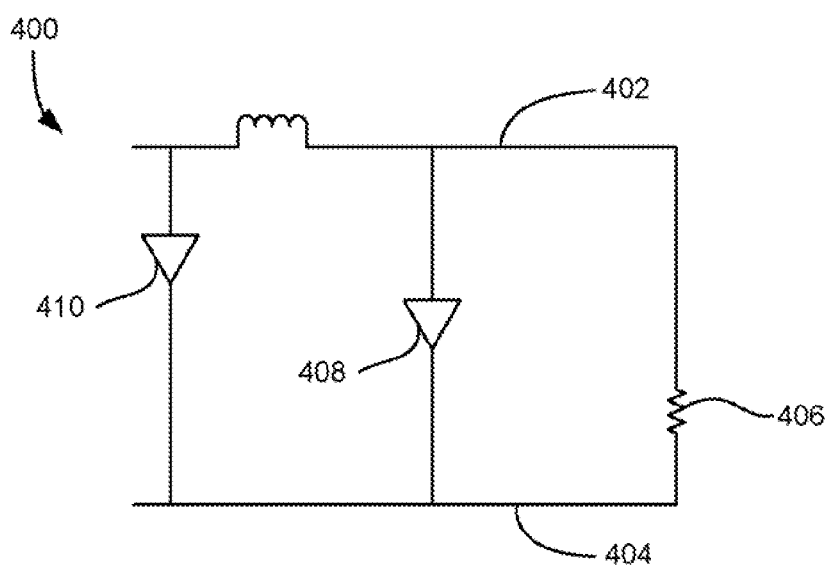
FIG. 4 is a diagram of a system for protecting an electronic device from an electrical event according to one embodiment of the present invention.

FIG. 4 illustrates a system 400 for protecting an electronic device from an electrical event according to another approach of the present invention. The system includes first and second leads 402, 404 adapted for passing an electric current through an electronic device 406. A first diode protection mechanism 408 is coupled to the leads such that the first diode protection mechanism is connected in parallel with the electronic device and positioned towards the electronic device when the leads are coupled to the electronic device. A second diode protection mechanism 410 is coupled to the leads such that the second diode protection mechanism is connected in parallel with the electronic device and positioned away from the electronic device when the leads are coupled to the external electronic device (a distal location), the second diode protection mechanism being for decreasing the pulse width of the electrical event. The second diode protection mechanism in conjunction with the inductance of the lead between the first and second diode protection mechanisms or between the second diode protection mechanism and the electronic device shortens the pulse width of the electrical event. The net result is that the electronic device can be exposed to much higher voltage or current before it becomes damaged due to the shorter pulse width. As stated earlier, in actual protection, crossed diodes should be used to protect against high current events of either polarity.

In an illustrative embodiment, a cable coupled to an electronic device can be considered an inductor. The first diode protection mechanism is positioned closer to the electronic device than the second diode protection mechanism, and preferably very close to the electronic device. The second diode protection mechanism, preferably located towards the end of the cable away from the electronic device (a distal location), lowers the pulse width for electrical events originating off the cable end.

When diodes are placed near the sensors (a proximal location), the cable inductance is located between the damage source and the diodes. The sources are typically high frequency. For a machine model (MM) or charge couple device (CCD), the pulses are typically between 1 and 5 ns duration ($\tau$). With an inductance (L) of 30 to 100 nH, the cable impedance is: $2*\pi*L/\tau$ or between about 37 and 630 $\omega$ for pulse widths between about 1 and 5 ns s. With the diodes near the head, they will limit the voltage across the head to the diode limiting voltage ($V_d$). With the diodes placed at the other end of the cable, the cable impedance will be added. For a 100 $\omega$ head, the voltage across the head will be reduced to between 73% (100/137) and 14% (100/730) of the diode voltage under the above mentioned conditions.

As in the embodiments described above and in any of the embodiments presented herein, the diode protection mechanism may be the same or different, may contain crossed diodes, may contain different numbers of diodes and/or diodes having different characteristics, etc.

Figure 5:
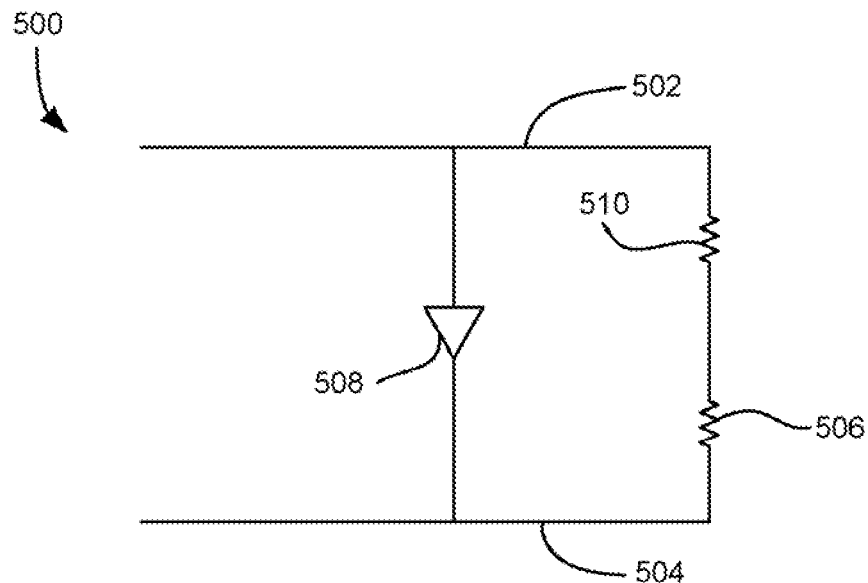
FIG. 5 is a diagram of a system for protecting an electronic device from an electrical event according to one embodiment of the present invention.

FIG. 5 depicts a system 500 for protecting an electronic device from an electrical event according to yet another embodiment of the present, invention. As shown, the system includes first and second leads 502, 504 adapted for passing an electric current through an electronic device 506. A first diode protection mechanism 508 is coupled to the leads such that the first diode protection mechanism is connected in parallel with the electronic device when the leads are coupled to the electronic device. A resistor mechanism 510, e.g., a resistor or other device creating a resistance, is coupled in series with the electronic device.

Placing a resistor mechanism in series with the electronic device such as an MR sensor reduces the voltage across the electronic device during an electrical event. For example, if the resistance value of the resistor mechanism is equal to the resistance value of the electronic device, the voltage across the electronic device is cut in half.

In one example, if a TMR sensor with a 100 ohm resistance at failure is damaged with a voltage of the order of 0.5 V, then a PN diode connected in parallel with the TMR sensor will not protect it. The lack of protection with a PN diode is due to the high turn on voltage of 0.6 to 0.8 V. A Schottky diode connected in parallel with the TMR sensor may not offer sufficient protection if the diode reaches a voltage value of 0.5 V at too low a shunt current. To add additional protection to the TMR sensor, a ~100 ohms protection resistor can be added in series with the TMR sensor, cutting the voltage across the TMR sensor in half. A set of diode(s) can then be connected in parallel with the series connected TMR sensor and protection resistor. The larger the value of the protection resistor, the greater will be the protection. A disadvantage of adding too large a value of a protection resistor is that it degrades the signal-to-noise of the system.

To create the device, commercially available diodes may be used. As many diodes as required are coupled to the substrate and contact leads. The diodes would be bonded to either the cable or the substrate. The bonding methods could include solder methods, wire bond or anisotropic conductive films (ACFs), to name a few. The diodes could also be fabricated directly on the wafer containing the sensors, if the latter are built on a silicon or germanium wafer. The diodes can also be specifically designed for the desired characteristics of the tape head sensor elements. The diodes can be customized in the applications with the tape head sensor elements so that the diodes shunt a minimum current at the sensor operating point but offer a maximum protection in the case of an ESD event.

The systems presented herein may be embodied on a cable adapted for coupling to the electronic device. For instance, the diode protection mechanisms, or portions thereof, may be formed on a cable using known methods. Likewise, the systems, or portions thereof, may be embodied on a common substrate with the electronic device using known methods. In further embodiments, the systems, or portions thereof, may be embodied in the form of a chip for coupling to a cable, to the electronic device, etc. In yet other embodiments, the systems, or portions thereof, may be coupled to a cable or the electronic device via a compression coupling. Accordingly, the phrase "when the leads are coupled to the electronic device" is meant to encompass all possible configurations, including leads detachable from the electronic device, such as in a cable or chip; leads integral to the electronic device, such as in leads formed with other layers of the device during thin film processing; leads permanently bonded to the electronic device; etc.

As noted above, a chip with diodes can be purchased or fabricated, and then the diode containing chip is attached to a substrate. For example, a single chip could be specially fabricated with the complete number of diodes for the complete number of sensor elements needed to protect. Off-the-shelf diode packages could also be potentially used. For example, a commercial packaged diode chip may have 8 diodes. If only two diodes (for dual polarity) are needed per element, and the tape head has eight sensor elements, then a minimum of two packaged diode chips could be used to couple to the tape head sensor elements. If the tape head has 16 sensor elements, then a minimum of four packaged diode chips of 8 diodes each would be required to protect all of the tape head sensor elements. Thus, the number of packaged diode chips required may be based on the number of sensor elements in the head. An illustrative chip which may be used with the present invention is the MMAD1108 diode array available from Microsemi, 8700 E. Thomas Rd. PO Box 1390, Scottsdale, Ariz. 85252 USA. These low capacitance diode arrays are multiple, discrete, isolated junctions fabricated by a planar process and mounted in a 16-PIN package for use as ESD protection diodes, protecting up to eight I/O ports from ESD, EFT, or surge by directing them either to the positive side of the power supply line or to ground. Alternatively, chips may contain multiple diodes, possibly for each sensor in an array of sensors.

Figure 6:
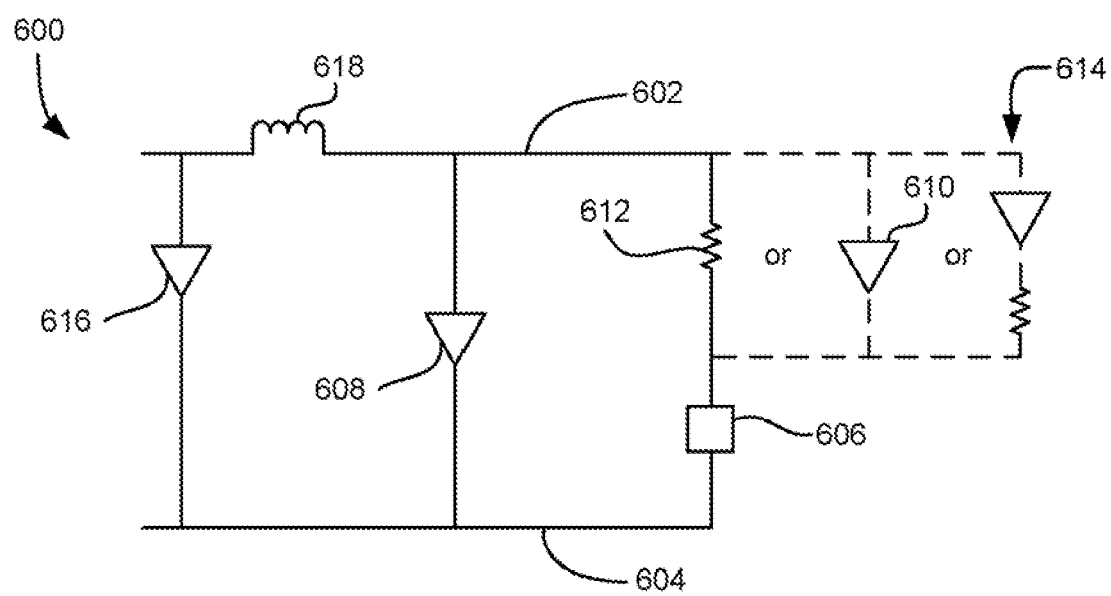
FIG. 6 is a diagram of a system for protecting an electronic device from an electrical event according to one embodiment of the present invention.

FIG. 6 illustrates a system 600 for protecting an electronic device from an electrical event according to one embodiment, the system including many of the components disclosed above. As shown, the system includes first and second leads 602, 604 adapted for passing an electric current through an electronic device 606 such as an MR sensor. A first diode protection mechanism 608 is coupled to the leads such that the first diode protection mechanism is connected in parallel with the electronic device when the leads are coupled to the electronic device. A second diode protection mechanism 610 or a resistor protection mechanism 612 or diode and resistor mechanism 614 is coupled in series with the electronic device when the leads are coupled to the electronic device. A third diode protection mechanism 616 is coupled to the leads such that the third diode protection mechanism is connected in parallel with the electronic device and positioned away from the electronic device when the leads are coupled to a distal electronic device, the third diode protection mechanism, being for lowering a pulse width of the electrical, event. Preferably, one leg of the third diode protection mechanism is connected to the first lead 602 and the other leg to the second lead 604, with both connections being on the distal ends of the cable. The inductor 618 represents the cable or lead inductance separating diode protection mechanism 616 from diode protection mechanism 608.

Figure 7:
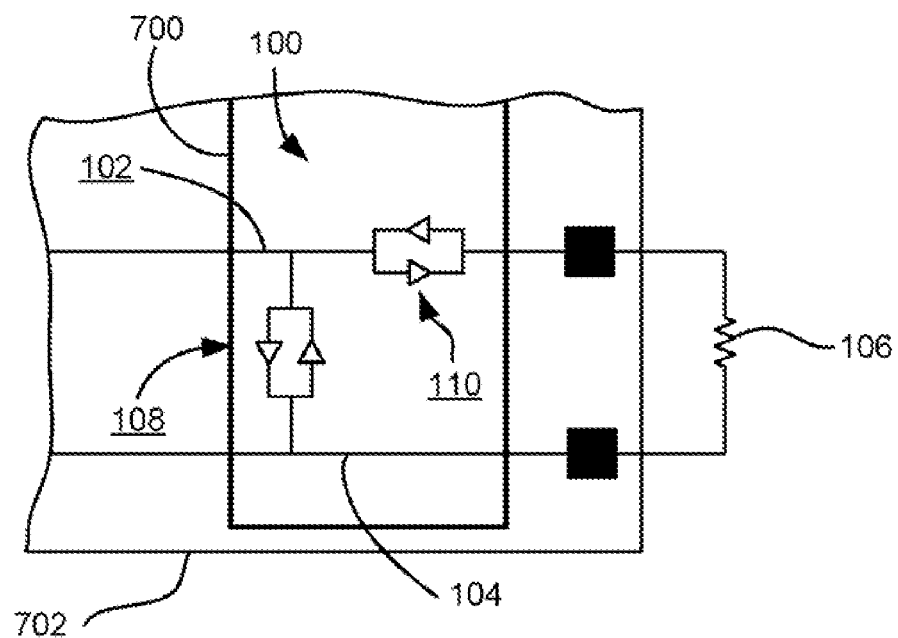
FIG. 7 is a diagram of a system for protecting an electronic device from an electrical event according to one embodiment of the present invention.

FIG. 7 illustrates an embodiment in which the system 100 of FIG. 2 is present on a diode chip 700. The diode chip 700 contains a first 108 and a second 110 diode protection mechanism. As shown, the system includes first and second leads 102, 104 adapted for passing an electric current through an electronic device 106 such as an AMR, a GMR or a TMR sensor. The leads are part of a cable mechanism 702, e.g., a standard cable of a type known in the art or having components typical of such cables. A first diode protection mechanism 108 is coupled to the leads such that the first diode protection mechanism is connected in parallel with the electronic device when the leads are coupled to the electronic device. A second diode protection mechanism 110 is coupled in series with the electronic device when the leads are coupled to the electronic device. The diode chip 700 may be coupled to the leads 102 and 104 by any suitable mechanism, such as soldering, bonding with a conductive adhesive (e.g., anisotropic conductive film, or "ACF"), compression fitting, etc. The electronic device 106 may be coupled to the leads 102 and 104 by any suitable mechanism, such as soldering, bonding with a conductive adhesive (e.g., anisotropic conductive film, or "ACF"), compression fitting, etc.

Of course, diode protection mechanisms 108 and 110 could also be on separate diode package chips, and the concept would be similar.

Figure 8:
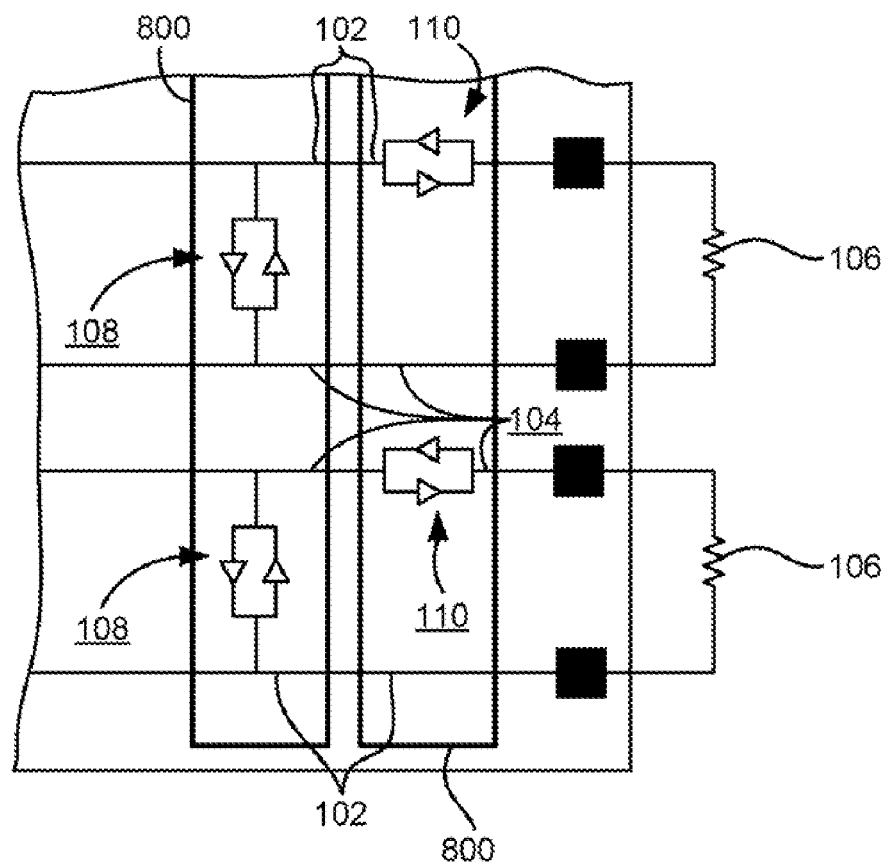
FIG. 8 is a diagram of a system for protecting an electronic device from an electrical event according to one embodiment of the present invention.

FIG. 8 illustrates an embodiment in which the system of FIG. 2 is present on multiple chips 800 and multiple electronic devices 106 are present. As shown, the system includes first and second leads 102, 104 adapted for passing an electric current through an electronic device such as an MR sensor. First diode protection mechanisms 108 are coupled to the leads such that the first diode protection mechanism is connected in parallel with the electronic device when the leads are coupled to the electronic device. Second diode protection mechanisms 110 are coupled in series with the electronic device when the leads are coupled to the electronic device.

Figure 9:
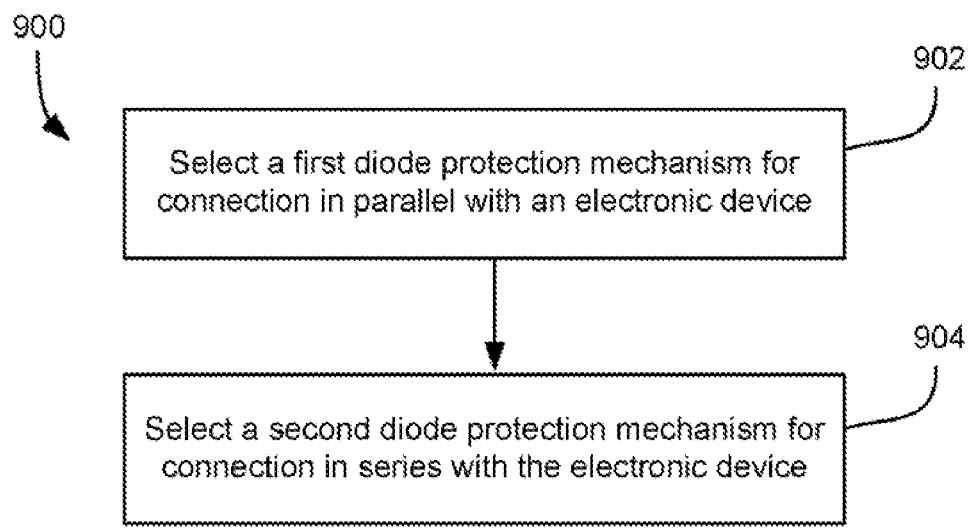
FIG. 9 is a flow diagram of a method for selecting diode protection mechanisms for protecting an electronic device from an electrical event according to one embodiment of the present invention.

FIG. 9 depicts a general method 900 for selecting diode protection mechanisms for protecting an electronic device from an electrical event according to one embodiment of the present invention. In operation 902, a first diode protection mechanism is selected for connection in parallel with an electronic device. In operation 904, a second diode protection mechanism is selected for connection in series with the electronic device. The diode protection mechanisms are preferably selected such that more current flows through the electronic device and the second diode protection mechanism when a current or voltage in an operating range is applied to leads of the electronic device, and more current flows through the first diode protection mechanism when a current or voltage higher than the operating range is applied to the leads of the electronic device. Several examples of methodology that may be used to perform this general method are presented below.

In brief, at current levels which can damage the electronic device, it is preferable to minimize the current running through the electronic device and thus have most of the current shunted through the diode protection mechanism coupled in parallel with the electronic device. Conversely, at lower voltages, e.g., in the operating range, it is preferable to have most current running through the electronic device (and diode coupled in series with the electronic device). Accordingly, the systems of the present invention can be tuned to maximize the current through the electronic device at lower current levels, e.g., at operating levels, while maximizing the current through the diode protection mechanism coupled in parallel with the electronic device upon occurrence of an adverse electrical event. Again, guidance for selecting the desired properties of the diode protection mechanisms is presented below.

There are many ways to select diode mechanisms that have the desired characteristics. For instance, pre-made, or "off the shelf" diodes can be selected. Additionally, the characteristics of individual diodes, or groups thereof, can be tuned by altering their composition or construction. For instance, variables that can be adjusted are carrier concentrations, dopant types, dopant levels, band gap levels, etc. These variables in turn determine how the diode protection mechanism will operate.

The diode protection mechanism can also be tuned simply by changing the number of diodes used for the series or the parallel diode mechanism. For example, increasing the number of diodes in parallel from 1 to $n_1$ (>1) will result in $n_1$-times the amount of current flowing through the given diode mechanism for a fixed voltage drop across the diode mechanism. Increasing the number of diodes for the parallel diode mechanism results in more current being shunted through the parallel diodes and less through the electronic device. Increasing the number of diodes for the series diode mechanism results in more current in the operating range passing through the series diodes and the electronic device.

Note that for devices that are very sensitive to electrical events, the turn on values for the parallel and series diodes may be selected to be about equal.

Also presented below are precepts and guidance for selecting diode protection mechanisms for other types of embodiments, including the case where diode protection mechanisms are positioned towards opposite ends of a cable.

DETAILED DESCRIPTION AND EXAMPLES

One benefit afforded by several embodiments of the present invention is protection from ESD damage. To analyze the different protection circuits, it is important to understand the function of a diode. An ideal diode will first be explained, followed by a description of an actual diode which includes an internal diode resistance which is in series with an ideal diode.

Ideal Diode Model:

A mathematical treatment of an ideal diode is as follows: The current ($I_d$) from a diode at a fixed voltage (V) is:

$$I_d(V,T)=I_o[\exp(eqV/[K_BT])-1]=I_o(T)[\exp[V/V_g(T)]-1], \text{ with} \quad (1)$$

$$V_g(T)=K_BT/[eq], \text{ and} \quad (2)$$

$$I_o(T)=I_{oa}\exp(-eV_o/[K_BT]). \quad (3)$$

where e is the charge of an electron, T is the temperature and $K_B$ is Boltzmann's constant. $I_{oa}$, $V_o$, and q ($1 \geq q \geq 0$) are diode parameters.

Connecting multiple diodes in parallel will drop the effective resistance of the group. With $n_1$ diodes connected in parallel, the total, current ($I_{total}$) will be $n_1 I_d$.

$$I_{total}=n_1 I_d \quad (4)$$

Thus, for a fixed voltage, the resistance of the diodes ($R_{total}$) is given by the ratio $V/I_{total}$:

$$R_{total}=V/I_{total}=[V/I_d(V,T)]/n_1=R_d(V,T)/n_1, \quad (5)$$

with $$R_d(V,T)=V/I_o[\exp[V/V_g(T)]-1]. \quad (6)$$

The above equations describe the IV characteristics of an ideal diode. One important aspect, of actual diodes which influences their IV characteristics is their in-series resistance.

Current Source Case for Diodes with an In-Series Resistance:

Actual diodes contain an in-series resistance internal to the diode structure. As a result of the diode in-series resistance, the total diode voltage ($V_{total}$) is given by the sum of the ideal diode voltage (V in Equations 1-3) plus the voltage drop across a series resistance ($R_s$). The voltage, then, is the sum of the voltage across the ideal portion (V in Equation 1) plus the current ($I_{total}(V)$) times $R_s$:

$$V_{total}(V,T)=V+I_{total}(V)*R_s=I_{total}(V)[R_d(V,T)+R_s]. \quad (7)$$

Figure 10:
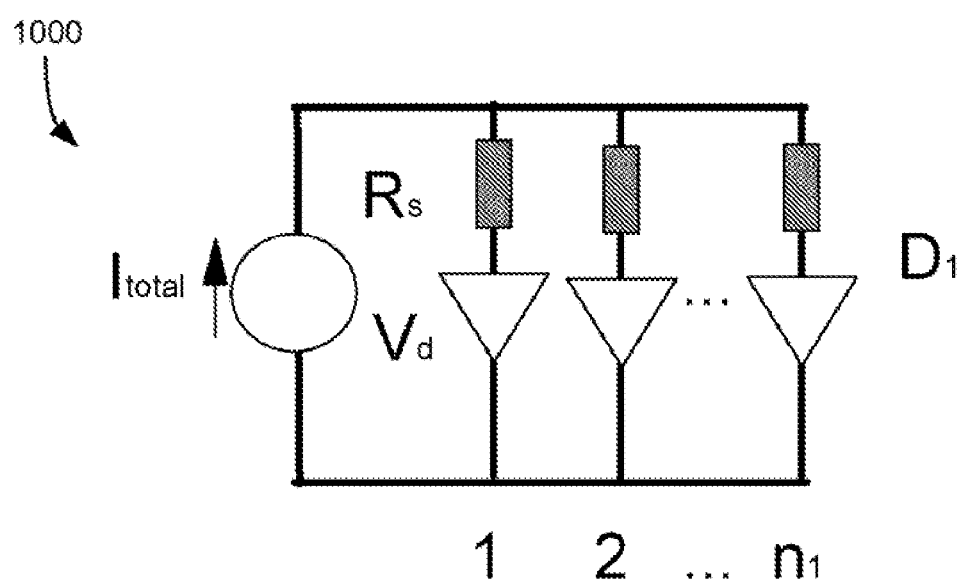
FIG. 10 is a schematic of a system having $n_1$ ideal diodes, each with an in-series resistance, all connected in parallel.
Figure 11A:
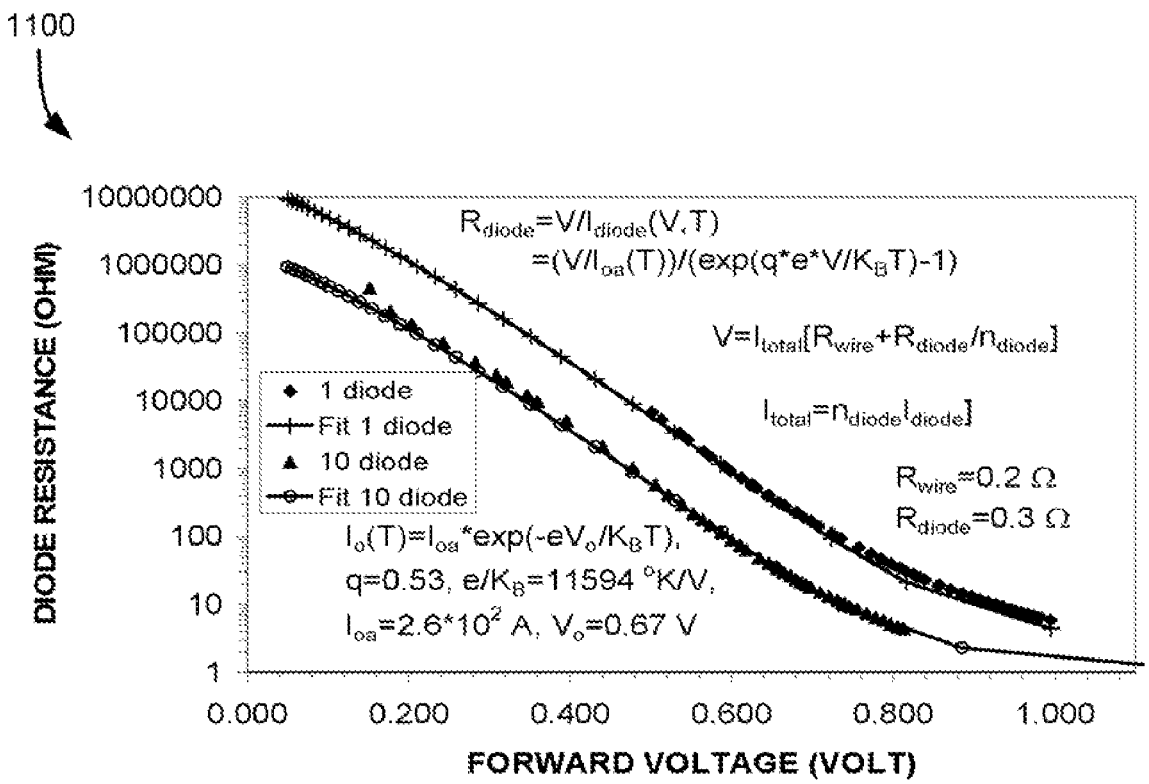
FIG. 11A is a chart of a resistance versus voltage (RV) curve for 1 and 10 diodes connected in parallel.
Figure 11B:
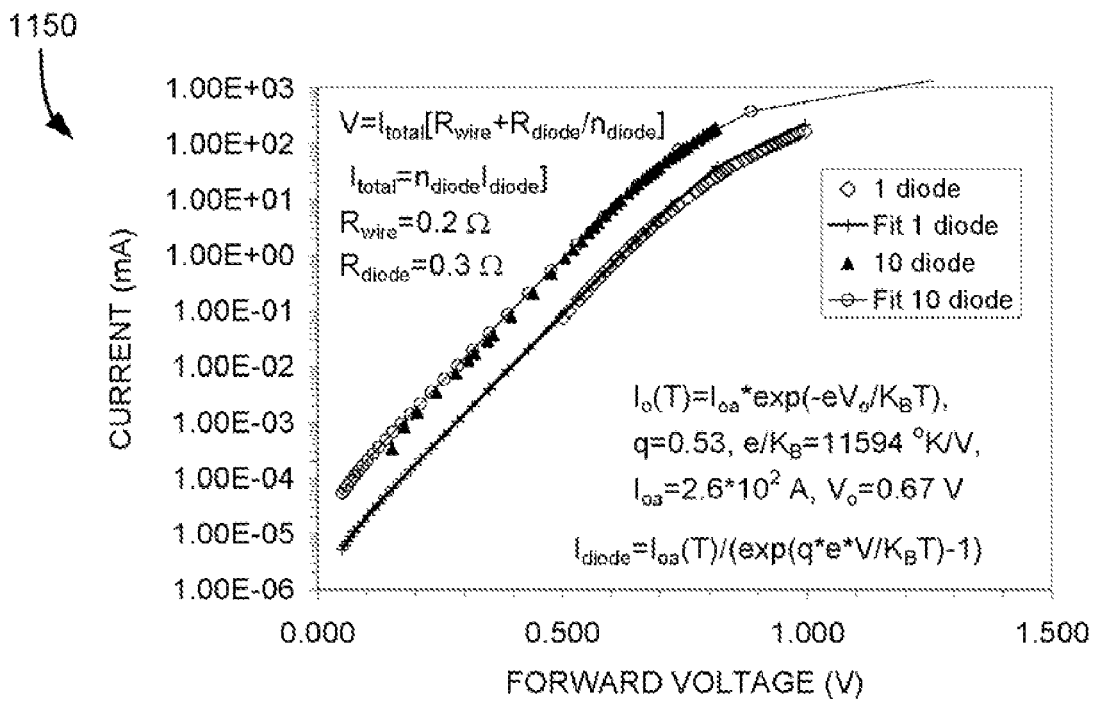
FIG. 11B is a chart of a current versus voltage (IV) curve for 1 diode and 10 diodes connected in parallel.

As noted above, a diode can be conceptually considered an ideal diode and a series resistance. To further explain, reference is made to FIG. 10, which is a schematic 1000 of $n_1$ diodes, in parallel. Each diode has a series resistance $R_s$, and an ideal diode component of voltage $V_d$. The more diodes present in parallel with each other, the lower the series resistance of the set of diodes, and consequently, the more freely an ESD-induced current will flow through the set of diodes. This is beneficial in that the lower the effective series resistance of a diode (or set thereof), the lower the voltage that will run through the electronic device during an electrical event. FIG. 11A graphically illustrates this by depicting a Resistance vs. Voltage (RV) curve 1100 for 1 and 10 1N914 diodes connected in parallel. The resistance is the sum of the diode and the external wire ($R_{wire}$) resistance. FIG. 11B shows a Current vs. Voltage (IV) curve 1150 for 1 diode and 10 diodes connected in parallel. The current is the total current through the diodes. In each case, a voltage was applied across the series connection of the diodes and a 59 ω bias resistor. FIGS. 11A and 11B show that the diodes in parallel decrease the resistance across the diodes for a fixed forward voltage value. Thus the in the high current regime is greatly decreased for a voltage source ESD/EOS event.

Determination of the Diode Parameters

Figure 16A:
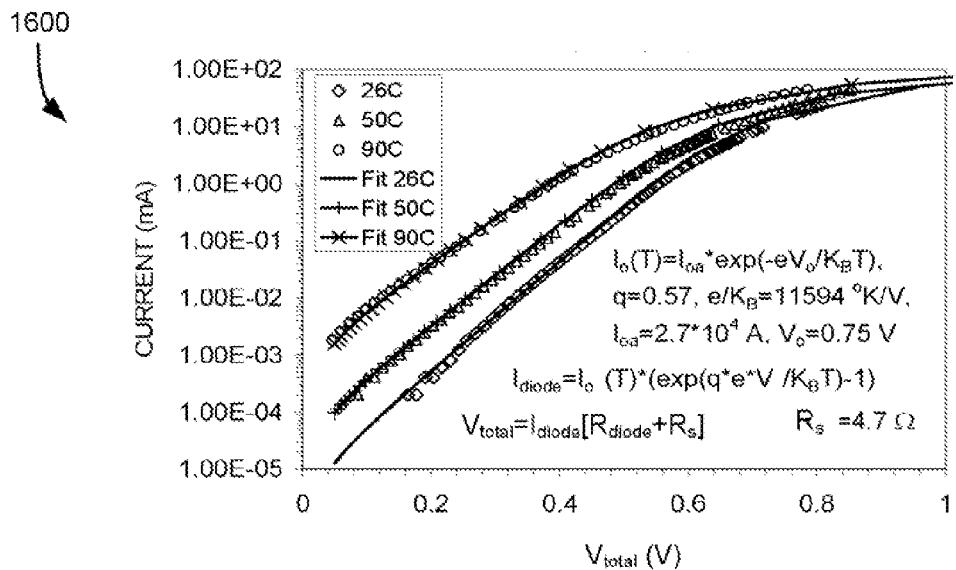
FIG. 16A is an IV curve for two forward biased PN diodes measured at 26, 50 and 90° C.
Figure 16B:
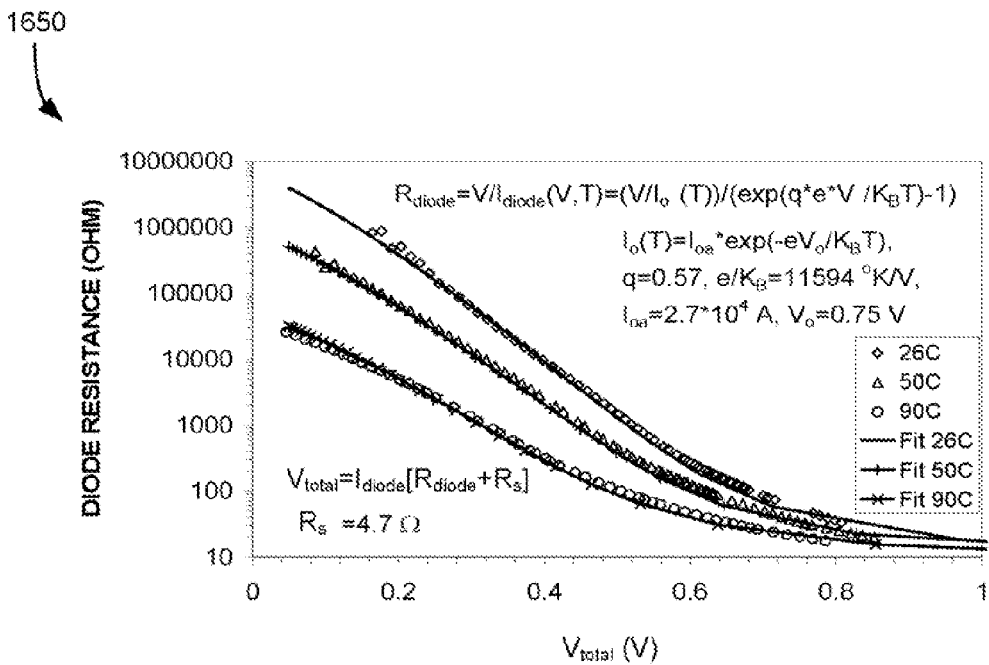
FIG. 16B is an RV curve for two forward biased PN diodes measured at 26, 50 and 90° C.

The parameters which define a diode, $I_{oa}$, $V_o$, q and $R_s$ can be measured experimentally by measuring the IV characteristics of the diode at several temperatures. FIGS. 16A and 16B show the current versus voltage (IV) and resistance versus voltage (RV) curves 1600, 1650 for two ideal diodes. Particularly, FIGS. 16A and 16B depict, for Diode DN6 (KOASpeer), (16A) current and (16B) resistance versus DC forward bias voltages at temperatures of 26, 50 and 90° C. The IV curves are fit to standard ideal diode equations (Equations 1-3) with a series resistance ($R_s$) of 4.7 ω added. The voltage is given by Equation 7 with Equations 1-3. The parameters used to fit the data are: $I_{oa}=2.7\times10^4$ A, $V_o=0.75$ V, q=0.57 and $R_s=4.7$ ω. The value of 0.57 for q indicates a similar concentration of electron and hole carriers.

Figure 17A:
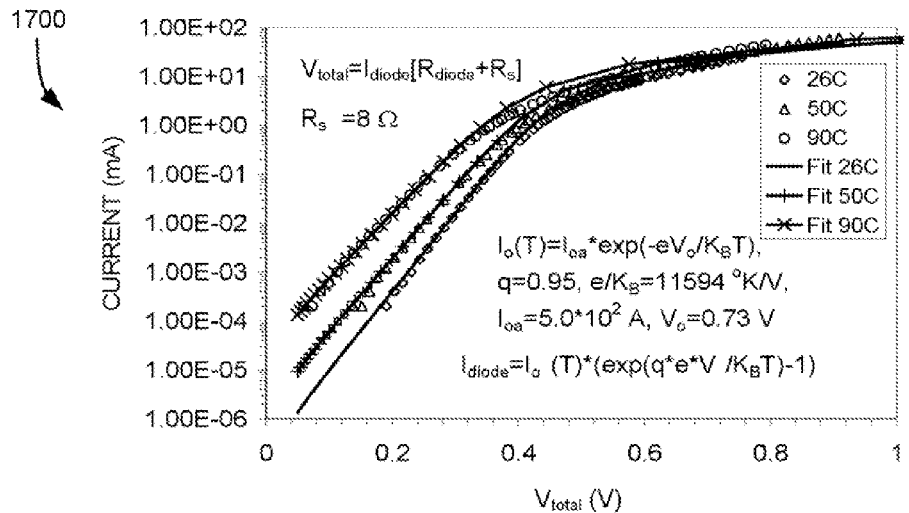
FIG. 17A is an IV curve for two forward biased PN diodes measured at 26, 50 and 90° C.
Figure 17B:
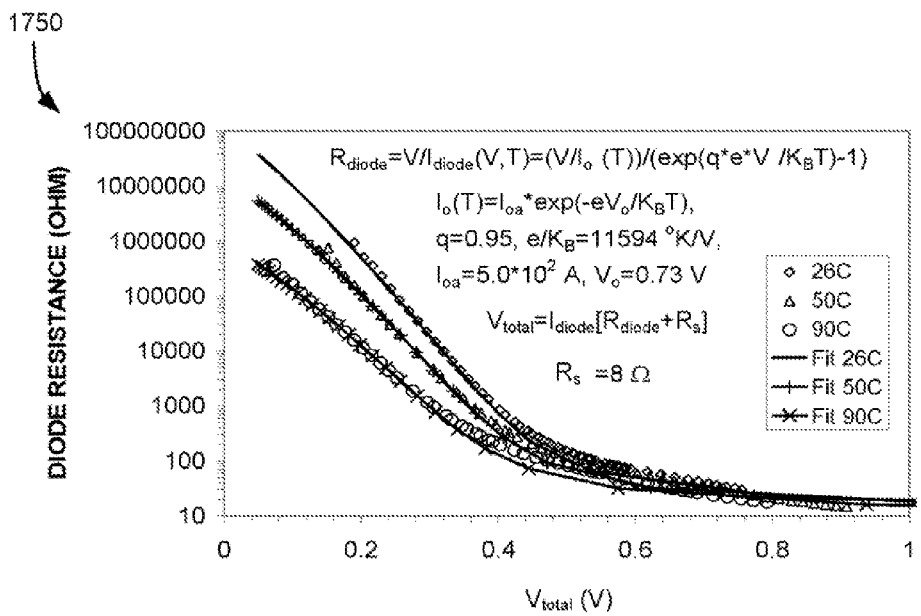
FIG. 17B is an RV curve for two forward biased PN diodes measured at 26, 50 and 90° C.

FIGS. 17A and 17B depict, for Diode DN4 (KOASpeer), curves 1700, 1750 for (17A) current and (17B) resistance versus DC forward bias voltages at temperatures of 26, 50 and 90° C. The IV curves are fit to a standard ideal diode equation with a series resistance of 4 ω added. The value of 0.95 for q indicates a one carrier type dominates. The voltage is given by the sum of the diode voltage plus the diode current times the wire resistance. The wire resistance includes the internal diode resistance.

Figure 21A:
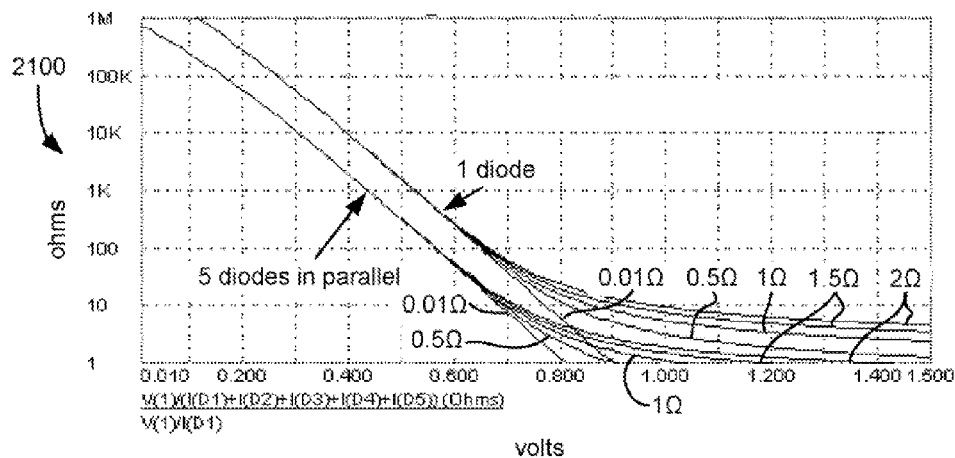
FIG. 21A is a plot of resistance versus voltage for a voltage source, RV curves for 1 and 5 diodes with in-series resistance values of 0.01, 0.5, 1, 1.5 and 2 ohms.
Figure 21B:
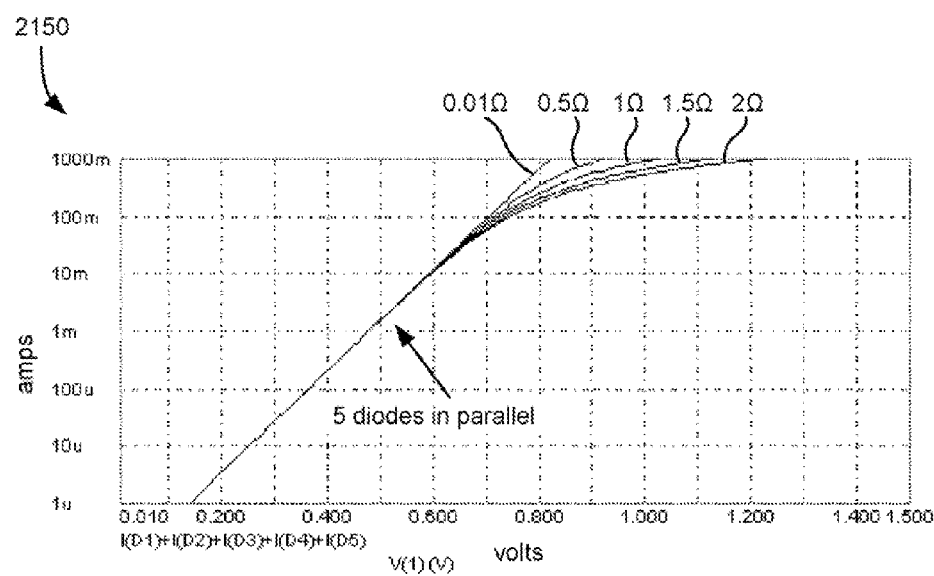
FIG. 21B is a plot of current versus voltage for a voltage source, IV curves for 5 diodes with in-series resistance values of 0.01 0.5, 1, 1.5 and 2 ohms.

A graphical analysis of the effect of an in-series resistance is shown in FIG. 21A, which is a is a plot 2100 of resistance ($V_{diode}/I_d$) versus voltage for a voltage source for a parallel connection of 1 and 5 diodes for the case where the diodes all have series resistance values of 0.01, 0.5, 1, 1.5 or 2 ohms. FIG. 21B is a plot 2150 of current versus voltage for a voltage source for a parallel connection of 5 diodes, where all 5 diodes have series resistance values of 0.01, 0.5, 1, 1.5 or 2 ohms. The curves were generated using an analytical model for diode D1N914. The plots show that the diode in-series resistance results in a decreased current for a set applied voltage across the diode than would occur for an ideal diode. The plots also verify that for a fixed voltage, the current shunting through $n_1$ diodes will be $n_1$ times the amount shunted through one diode, increasing the current level at which failure occurs by a factor of $n_1$.

Figure 15:
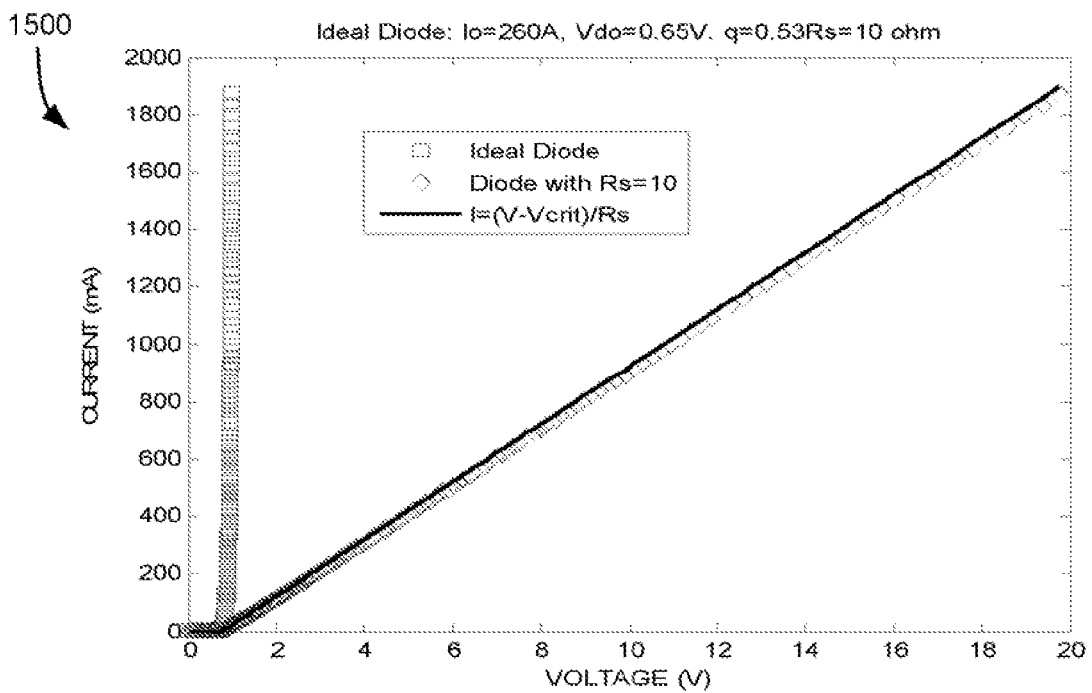
FIG. 15 is an IV curve for an ideal diode and an ideal diode with a 10 ohm series resistor.

Analytical Expression for a Diode in the High Current Limit:

In the low current regime for a diode, where $R_d(V,T)$ is $>>R_s$, the voltage drop is almost entirely across the diodes, so $V_{total} \sim V$, and the ideal diode equations describe the IV characteristics of the diode. In the high current regime, V is essentially a constant, given by $V_{crit}$. As long as the diode is in the conducting state, where $V_{total} \geq V_{crit}$, V varies little with a change in current, and the current is linear in the bias voltage above $V_{crit}$. FIG. 15 is an IV curve 1500 for an ideal diode and a single ideal diode with a 10 ohm series resistor. Also shown is a curve of the current derived from the following analytical functions:

$$I_{total} = 0 \text{ for } V_{total} \leq V_{crit} \text{ and} \quad (8)$$

$$I_{total} = (V_{total} - V_{crit})/R_{s2} \text{ for } V_{total} > V_{crit} \quad (9)$$

$V_{crit}$ is defined as the voltage when the current through the diode reaches a specific value, $I_{crit}$:

$$V_{crit} \equiv \log_e(I_{crit}/I_o) * K_B T/eq. \quad (10)$$

In the case of FIG. 15, $I_{crit}$ is arbitrarily taken to be 20 mA. Notice that for the case of an ideal diode, the voltage curve is very steep once the forward voltages are greater than $V_{crit}$.

Figure 12A:
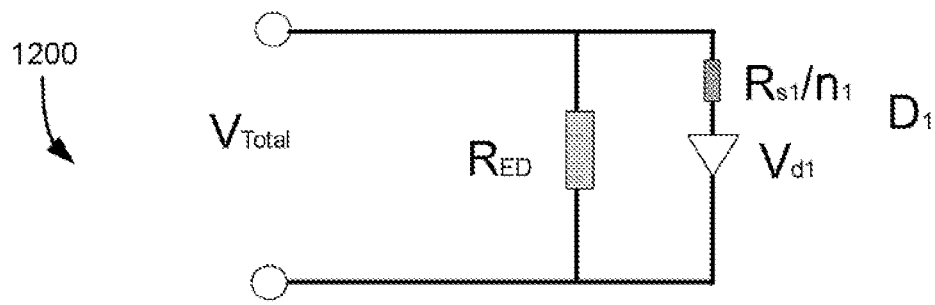
FIG. 12A illustrates an equivalent schematic, of a system in which $n_1$ diodes are connected in parallel with each other and with an electronic device (ED) according to one embodiment of the present invention.

ESD Protection Utilizing Diodes Groups Connected in Parallel ($D_1$) with the Electronic Device:

One form of protection for an electronic device (ED) is to connect a diode or several diodes in parallel with the ED to shunt current through the diodes during a high current electrostatic discharge (ESD) event. FIG. 12A illustrates an embodiment 1200 in which $n_1$ diodes are connected in parallel with each other ($D_1$ and in parallel with an ED to act as a current shunt. $I_{d1}$, $V_{d1}$ and $R_{s1}$ are the ideal diode current, voltage and series resistance of the individual diodes respectively, $n_1$ is the number of diode system $D_1$. $R_{ED}$ is the resistance of ED. The total current ($I_{total}$) through the circuit shown in FIG. 12A is given by the sum of the current through branches $D_1$ and ED:

$$I_{total} = n_1 I_{d1} + I_{ED}. \quad (11)$$

The applied voltage across $D_1$ is equal to the voltage across ED and is given by:

$$V_{total} = V_{d1} + I_{d1} R_{s1} = I_{ED} R_{ED}. \quad (12)$$

By combining Equations 11 and 12, $I_{ED}$ can be expressed as:

$$I_{ED} = [I_{total}[R_{s1}/n_1] + V_{d1}]/[R_{ED} + R_{s1}/n_1] \sim I_{total}[R_{s1}/n_1 R_{ED}] + V_{d1}/R_{ED}. \quad (13)$$

where the approximation is in the limit where $R_{s1}/n_1 << R_{ED}$. The total failure current ($I_{total-fail}$) is when the current through the ED reaches it's failure limit ($I_{ED\_fail}$) is derived from Equation 11 and by replacing $I_{ED}$ by $I_{ED\_fail}$ and $I_{total}$ by $I_{total-fail}$:

$$I_{Total\_fail} = n_1 [R_{ED}/R_{s1}][I_{ED\_fail} - V_{d1} R_{ED}]]. \quad (14)$$

The first term in Equation 13 is associated with the current shunted around ED through diode $D_1$, and results in a factor of $n_1[R_{ED}/R_{s1}]$ boost in the failure current compared to the isolated ED. The advantage of multiple parallel diodes is evident, and is shown to be linear in $n_1$. The second term in Equation 13 is the current flow through ED due to the minimum current through an ideal diode to turn it on when connected in parallel with a resistor $R_{ED}$. There can exist cases where $V_{d1}/R_{ED}$ is a significant fraction of $I_{ED\_fail}$. For example, for an ED with an $R_{ED}$ of 50 ohms, and an $I_{ED\_fail}$ of 20 mA, a PN diode with a $V_{d1}$ of 0.6 V yields a $V_{d1}/R_{ED}$ of 12 mA, or 60% of the failure current. Even a Schottky diode with a $V_{d1}$ of 0.3 V yields a $V_{d1}/R_{ED}$ of 6 mA, or 30% of the failure current.

Experimentally generated ESD Simulated Pulses and Diode Protection Using a Single Diode for $D_1$.

Figure 22A:
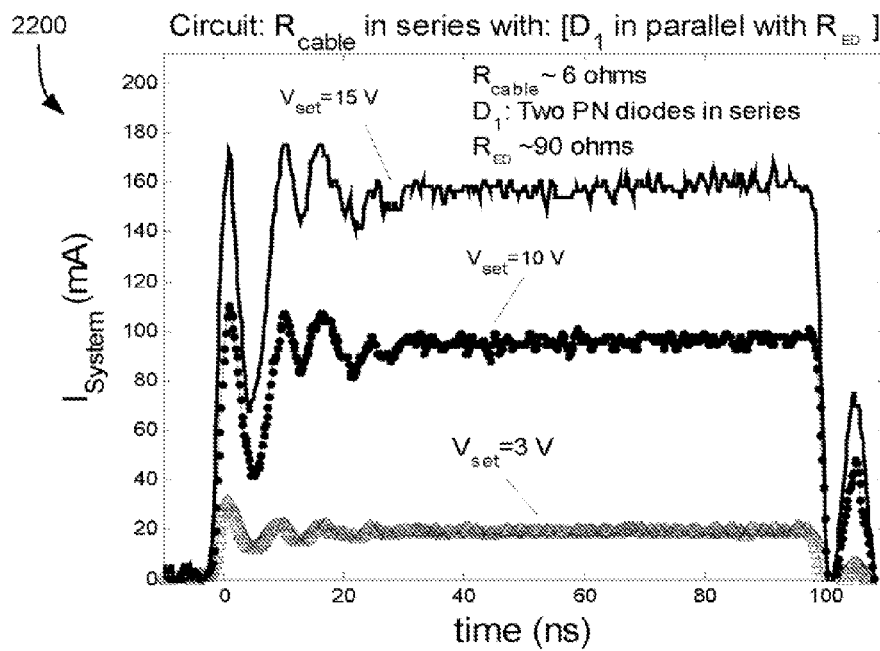
FIG. 22A is a plot of current versus time for a 100 ns wide current pulse through a cabled electronic device comprised or an MR stripe (and it's internal leads) (ED) on one end of a flexible cable and two forward oriented diodes connected in series with one another ($D_1$) and connected in parallel with the MR at the proximal end of the cable. A 50 ohm resistor is connected in series with the cabled ED. The voltages across the resistor and the cabled electronic device ($V_{set}$) were 3, 10 and 15.5 V.
Figure 22B:
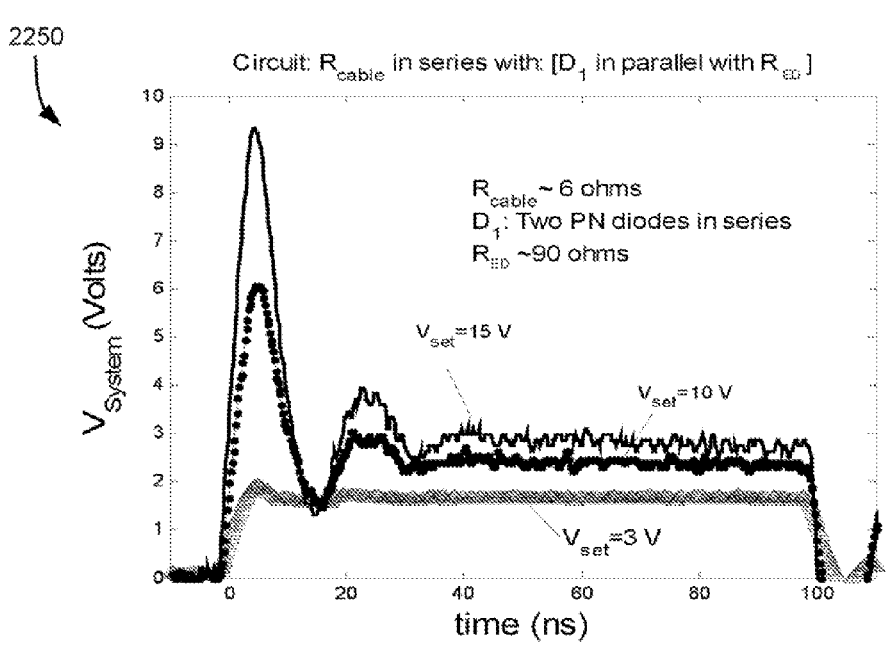
FIG. 22B is a plot of voltage across the ED versus time for the same circuit as described in FIG. 22A.

FIG. 22A shows the current through, and FIG. 22B the voltage across, dual diodes on a cable with an MR stripe (cabled sensor) using a 100 ns square pulses. The dual diodes are two DN6 diodes connected in series with the same polarity just prior to the cable-sensor connection (proximal location). A 50 ω bias resistor ($R_{bias}$) was connected in series with the cabled sensor at the distal location. A voltage pulse of magnitude $V_{set}$ and duration of 100 ns (pulse width) applied across the series connection of the bias resistor and the cabled sensor. $V_{set}$ values of 3, 10 and 15.5 V were used. The sensor had a resistance of about 80 ohm. Taking into account the cable resistance of 5 to 6 ω, and current levels of 19, 95 and 155 mA with voltages at the distal end of the cable of 1.65, 2,4 and 2.8 V, the voltage at the diodes is calculated to be: 1.55, 1.88 and 2.0 V for the three pulses. The resistances across the diode-sensor pair are then calculated to be: 81.5±0.5, 19.5±0.5 and 12.50±0.5 ω for the sequentially higher voltage pulses. The diode resistance ($R_{diode}$) can be determined from the resistance measured ($R_{measure}$) for the diodes in parallel with the cabled sensor:

$$R_{diode} = R_{measure}/(1 - R_{measure}/R_{sensor}). \quad (15)$$

The current through the sensor stripe ($I_{sensor}$) would be:

$$I_{sensor} = I_{total} R_{diode}/(R_{diode} + R_{sensor}) = I_{total}(R_{measure}/R_{sensor}). \quad (16)$$

With the $R_{sensor}$ of 80 ω, and $R_{measure}$ of 12.5 ω, and a current of 155 mA, $I_{sensor}$ would be 24 mA. Taking stripe failure for a 25 ns square pulse to be with a current of ~50 mA (HBM equivalent), failure, then would then be at a total current level of about 300 mA, or six times higher than without the diodes. While the protection is substantial, an effective diode resistance of 12.5 ω is very high, if $R_{diode}$ can be decreased, then $I_{sensor}$ will also be decreased and the protection will be higher.

Figure 24A:
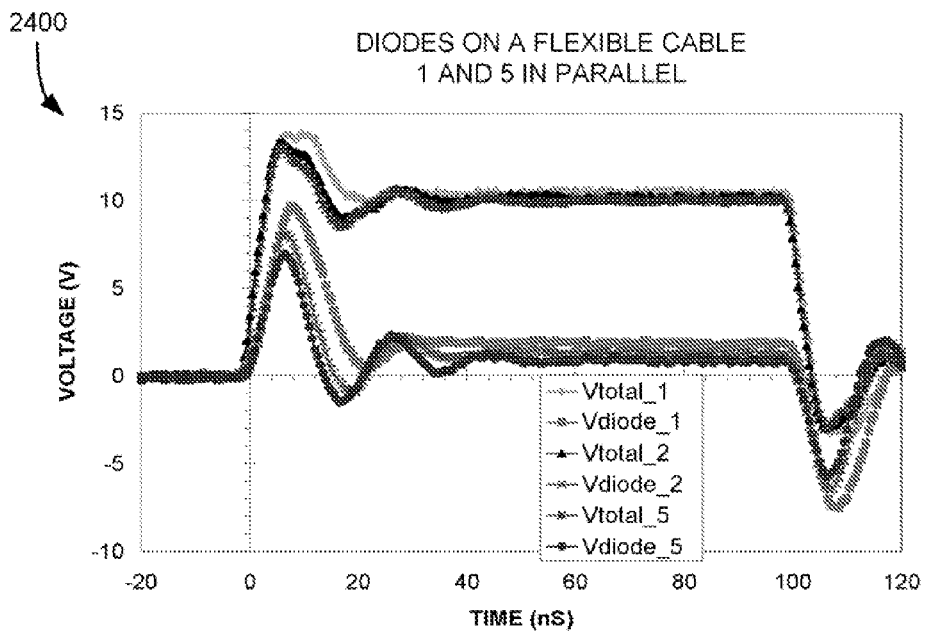
FIG. 24A is a plot of the voltage across cabled diodes and with 1, 2 and 5 connected in parallel and total voltage versus time.
Figure 24B:
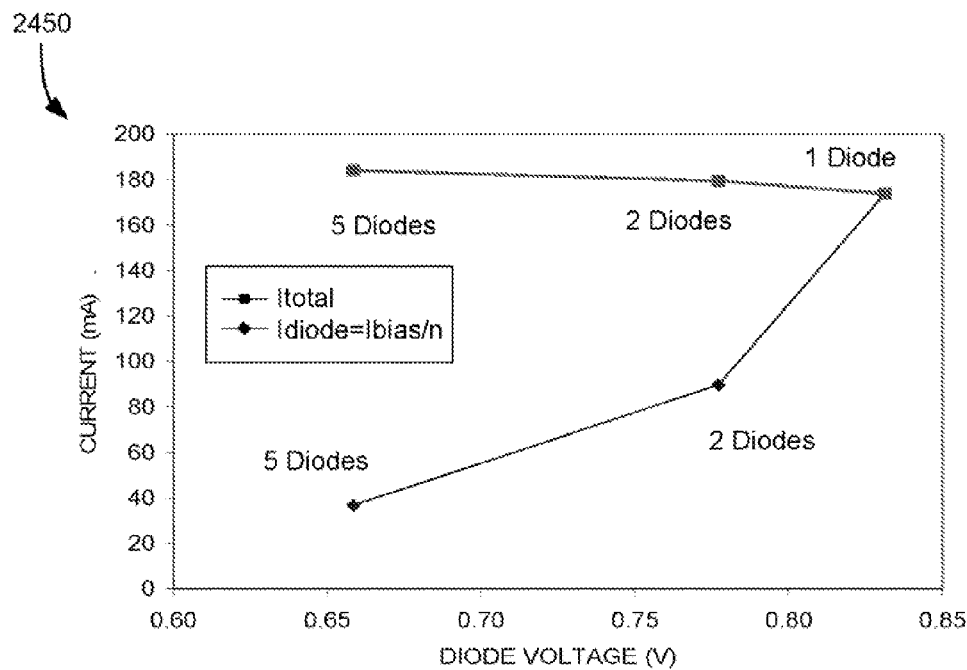
FIG. 24B is a plot of total current and current per diode versus diode voltage for 1, 2 or 5 diodes connected in parallel. The total current was set to be approximately 180 mA for all three cases.

Experimental Evidence of the Benefit of Multiple Diodes in Parallel for D1:

A test of diodes in parallel is shown in FIGS. 24A, 24B and Table 4. FIG. 24A is a plot 2400 of the total applied voltage and the voltage across several cabled diode configurations (the latter of which are connected in parallel) versus time for constant voltage pulses of 100 ns duration. The cabled diode configurations consisted of 1, 2 and 5 groups of cabled diodes connected in parallel with one another. A PN diode bridging across two cable leads was connected at the far end of a cable. The cables had a resistance ($R_{cable}$) of 6 ω. The equivalent circuit for the cabled diode is an ideal diode with a series resistance of the cable plus the internal series resistance of the diode. Using Equation 12, $R_{s1}$ is replaced by $R_{s1} + R_{cable}$. FIG. 24B is a chart 2450 of the total current and the current through each individual cabled diode versus applied voltage for a constant voltage pulse with a 100 ns duration.

The data is given in Table 4. In generating Table 4, the measured parameters are the total voltage ($V_{total}$) and current ($I_{total}$) through all cabled diodes. The total resistance ($R_{total}$) is calculated using ohm's law. The current through each individual cabled diode ($I_d$) is $I_{total}/n_d$, where $n_d$ is the number of cabled diodes connected in parallel. The voltage across the diode ($V_d$) is the total voltage minimum the voltage across the 6 ohm cabled resistance ($V_{cable}=I_d*R_{cable}$). The effective resistance of the diodes is given by $V_d/I_d$.

As shown in FIG. 24B, the higher the number of cabled diodes connected in parallel, the lower the current through each cabled diode, and the lower the effective diode series resistance. Still, 5 diodes in parallel reduced the voltage across the combined diodes by a factor of two, which would reduce the current through a sensor which is connected in parallel with the diodes. Note that with 5 cabled diodes connected in parallel, the peak voltage across the diode configuration was decreased from 0.83 V to 0.66 V. In other words, with 174 mA of total current, the voltage across a single diode was 0.83 V while with 184 mA, the voltage across 5 diode-pairs connected in parallel was 0.66 V, For a 100 ω electronic device the current through the electronic device would drop from 8.3 mA with one diode to 6.6 mA when using 5 diodes in parallel rather than a single diode. The power into the electronic device would drop from 18.0 mW to 9.6 mW, or a 47% reduction in the heating or temperature rise. Thus, 5 diodes in parallel offer a significant added protection over 1 diode.

TABLE 4

Single diodes DN4 diodes on flexible cable with a cable resistance of 6 ohms. 1 and 5 cabled diodes in parallel. The diode groups are connected in series with a 50 ohm bias resistor and a 100 ns voltage pulse was applied across the series connection of the bias resistor and the diode system. Note, the 5 diodes were not turned on fully.

| | | Number of diodes ($n_d$) | | |
|---|---|---|---|---|
| | (#) | 1 | 2 | 5 |
| $V_{set} = V_{total} + V_{bias}$ | (V) | 10.57 | 10.29 | 10.08 |
| $V_{bias}$ | (V) | 8.70 | 8.98 | 9.20 |
| $I_{total}$ | (mA) | 173.9 | 179.5 | 184.04 |
| $V_{total}$ | (V) | 1.87 | 1.32 | 0.88 |
| $R_{total}$ | (ohm) | 10.78 | 7.33 | 4.78 |
| $I_d = I_{total}/n_d$ | (mA) | 173.9 | 89.8 | 36.81 |
| $V_{cable} = I_d * R_{cable}$ | (V) | 1.04 | 0.54 | 0.22 |
| $V_d = V_{total} - V_{cable}$ | (V) | 0.83 | 0.78 | 0.66 |
| $R_d = V_d/I_d$ | (ohm) | 4.78 | 8.66 | 17.89 |

Computer Generated ESP Simulated Pulses and Diode Protection Using 1 to 5 Diode for $D_1$.

To further prove out the model, simulated machine model (MM) pulses on a group of diodes connected in parallel with one another and with a 150 ohm electronic device were conducted. Human body model sources (HBM) of ESD are a 100 pf capacitor in series with a 1500 ohm resistor (ANSI/ESD STM5.1-2001). HBM sources are essentially current sources for devices in the 30 to 200 ohm range used in magnetoresistive (MR) devices. The MM source is a 200 pf capacitor with a "zero" ohm series resistance and a 500 nH inductor, (ANSI/ESD STM5.2-1999). Experience in the lab indicates that the inductance for a MM should be 30 to 100 nH rather than 500 nH.

Figure 23:
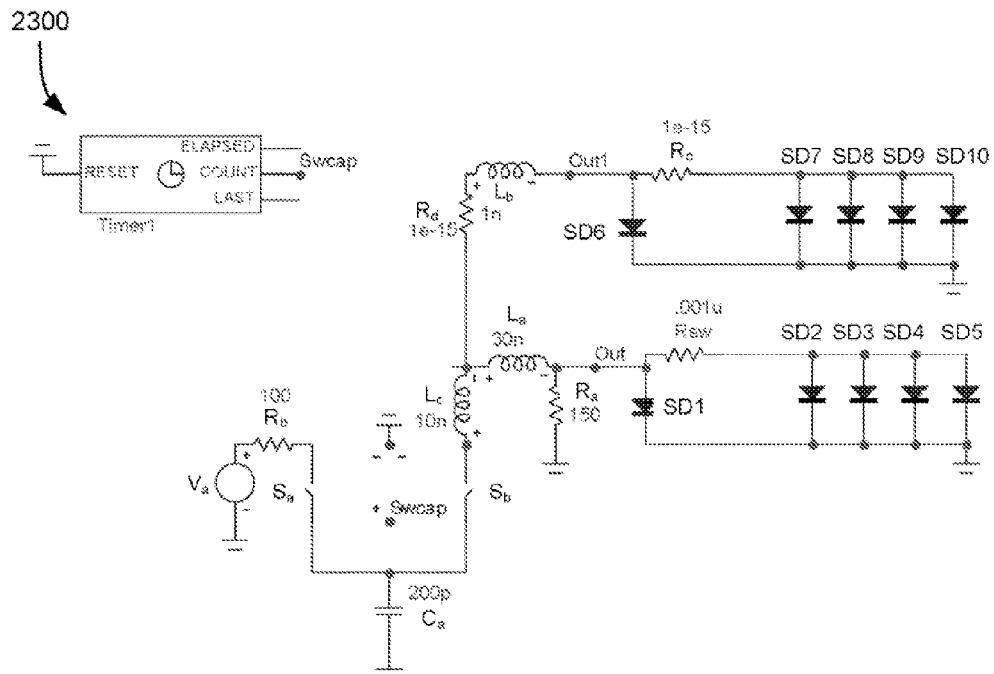
FIG. 23 is a schematic of a circuit employing 1 to 10 diodes.

The source of the current is a 200 pf capacitor with a 30 nH series inductance. The diodes types were D1N914 with either a 1.5 or a 10 ohm in-series resistance and a 1.5 pf capacitance. FIG. 23 shows the schematic of the circuit 2300 used to analyze the effect of diodes SD1-SD10 on the current through the device, which has a resistance Ra of 150 ω. Diodes SD1 to SD5 are located at the proximal end of the cable next to the device Ra. Diodes SD6 to SD10 are located at the input of the cable, which has an inductance (La) of 30 nH. Rsw, Rc and Rd are switches which are 0.001 ω when closed or 15 Tω when open. The source is a 200 pf capacitor (Ca) with an inductance which was varied from 0 to 100 nH. Additional components of the circuit 2300 include voltage source Va, resistor Rb, switch Sa, switch Swcap, switch Sb, and timer circuitry (Timer 1).

Table 1 shows the total current to achieve the same current through a 150 ohm resistor in parallel with 1 and 5 diodes with a diode series resistance of 1.5 and 10 ohms. The data in Table 1 used Lc=1 nH (essentially 0) and diodes SD6 to SD10 were not in the circuit. The effect of adding Lc is primarily to broaden the pulse width, and thus was not important for the discussion of the relative current levels. Lc was kept low to avoid any possible confusion in interpreting the data.

TABLE 1

The total current ($I_{total}$) necessary to achieve a fixed current through the device ($I_{ED}$) for 1 and 5 diodes in parallel. Two diode series resistances were chosen, 1.5 and 10 Ω. The device resistance was 150 Ω.

| Diode in-series resistance (Ω) | # diodes (#) | $I_{ED}$ (mA) | $I_{diodes}$ (mA) | $I_{per\_diode}$ (mA) | $I_{total}$ (mA) | $V_{cc}$ (V) |
|---|---|---|---|---|---|---|
| — | 0 | 10.5 | 0 | 0 | 10.5 | 1.58 |
| 10 | 1 | 10.5 | 92 | 92 | 102.5 | 2 |
| 10 | 5 | 10.3 | 442 | 88.4 | 452.5 | 7 |
| — | 0 | 6.24 | 0 | 0 | 6.24 | 0.94 |
| 1.5 | 1 | 6.24 | 88 | 88 | 94.2 | 2 |
| 1.5 | 5 | 6.24 | 416 | 83.2 | 424.2 | 6 |

The above section describes how connecting multiple diodes in parallel with each other and with the electronic device results in current being shunted around an electronic device, and thus increasing the current through the system at failure. More complex circuits utilizing diodes can be used to extend the protection. One case is to add a group of diodes (connected in parallel with one another) in series with the electronic device to act as a voltage divider. A second group of diodes (connected in parallel with one another) are then in parallel to the series connected electronic, device and voltage divider diode group. The second group of diodes acts as a current shunt to divert damaging current away from the electronic device.

Figure 12B:
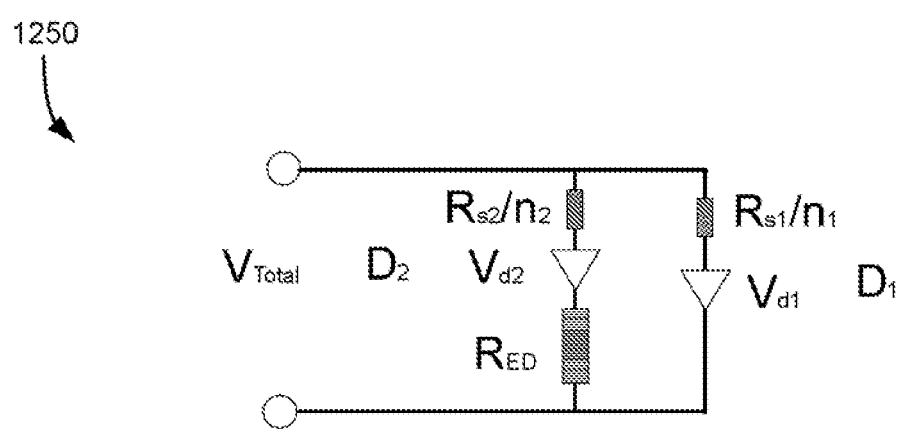
FIG. 12B illustrates an equivalent schematic of a system in which $n_2$ diodes ($D_2$) are connected in parallel with each other and in series with an electronic device (ED) and where $n_1$ diodes are connected in parallel with each other ($D_1$) and in parallel with the series connection of $D_2$ and ED according to one embodiment of the present invention.

ESP Protection Utilizing Diodes Groups Connected as Voltage Dividers and as Shunts:

FIG. 12B illustrates an embodiment 1250 in which $n_2$ diodes are connected in parallel with each other ($D_2$) and in series with an electronic device (ED) to act as a voltage divider $n_1$ diodes are connected in parallel with each other ($D_1$) and in parallel with the series connection of the ED and $D_2$ to act as a current shunt. $V_{dj}$ and $R_{sj}$ are the ideal diode voltage and series resistance of the individual diodes respectively, $n_j$ is the number of diode system $D_j$. $R_{ED}$ is the resistance of ED.

The circuit, shown in FIG. 12B and described above will now be derived analytically. The total current through the circuit shown in FIG. 12B is given by the sum of the current through branches $D_1$ and $D_2$:

$$I_{total}=n_1 I_{d1}+n_2 I_{d2}=I_{ED}+n_1 I_{d1} \tag{17}$$

$I_{dj}$ is the current through an individual diode in the $D_j$ group of $n_j$ diodes. The current through ED is equal to the total current through path $D_2(n_2 I_{d2})$. The total voltage is given by:

$$V_{total}=V_{d1}+I_{d1}R_{s1}=V_{d2}+I_{d2}R_{s2}+I_{ED}R_{ED}=V_{d2}+I_{ED}[R_{s2}/n_2+R_{ED}]. \tag{18}$$

By combining Equations 15 and 16, $I_{ED}$ can be expressed as:

$$I_{ED}=[I_{total}(R_{s1}/n_1)+(V_{d1}-V_{d2})]/[R_{ED}+R_{s1}/n_1+R_{s2}/n_2]. \tag{19}$$

For $R_{s1}/n_1 <<$ and $R_{s2}/n_2 << R_{ED}$, a limiting form of $I_{ED}$ is:

$$I_{ED} \sim I_{total}[R_{s1}/n_1 R_{ED}]+[V_{d1}-V_{d2}]/R_{ED}. \tag{20}$$

The first term in Equations 17 is due to the current shunting around the ED through diodes $D_1$. The second term in Equations 17 is the current flow through ED due to the net voltage across the ED from the ideal diodes $D_1$ and $D_2$, and is reduced by the voltage dividing effect of $D_2$ by a factor of $[V_{d1}-V_{d2}]/V_{d1}$ over the single diode group $D_1$. $I_{Total\_fail}$, then is given as:

$$I_{total\_fail}=[I_{ED\_fail}-(V_{d1}-V_{d2})/R_{ED}]n_1[R_{ED}/R_{s1}]. \tag{21}$$

The advantage of adding the diode $V_{d2}$ in series with the ED is to decrease the offset of from $V_{d1}/R_{ED}$ to $[V_{d1}-V_{d2}]/R_{ED}$. For example, if only $D_1$ is used, so $V_{d2}=0$, then for the case of $V_{d1}$ is 300 mV and $R_{ED}$ of 30 ω, $V_{d1}/R_{ED}$ is 10 mA. $I_{ED\_fail}$ is 20 mA then the protection is cut in half by the off-set: $V_{d1}/R_{ED}$. If $D_2$ is added, and $V_{d2}$ is chosen to be equal to $V_{d1}$, then the protection is maximized, and increases linearly with $n_1[R_{ED}/R_{s1}]$. Note that if $R_{ED} \leq [V_{d1}-V_{d2}]/I_{ED\_fail}$, the ED can not be protected. For $V_{d1}-V_{d2}=0.3$ V and $I_{ED\_fail}=15$ mA, the minimum $R_{ED}$ would be 20 ω.

Figure 14:
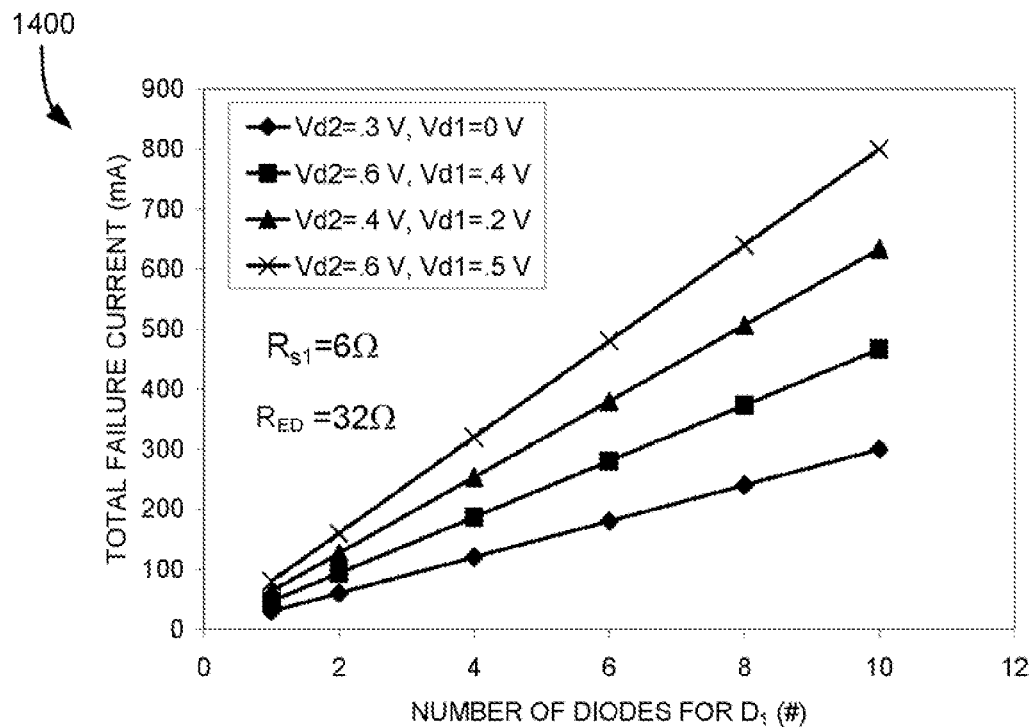
FIG. 14 is a chart of the total failure current for an ED using different diode protection schemes.

The chart 1400 of FIG. 14 plots the total failure current versus $n_1$ for an ED with a failure current of 15 mA and an $R_{ED}$ value of 32 ω with different diode protection schemes utilizing groups $D_1$ and $D_2$. In all cases, an $R_{s1}$ value of 6 ω is used. Equation 18 is used for the analysis, and thus $n_2$ is irrelevant. For one and 10 diode(s) with $V_{d1}=0.3$ V, $I_{total\_Max}$ is 30 and 300 mA or an improvement of a factor of 2 and 20 over the un-protected ED. The ultimate protection is with $V_{d2}=V_{d1}$. With $V_{d1}=V_{d2}=0.6$ V, $I_{total\_fail}$ is 80 and 800 mA for $n_1$ of 1 or 10. An intermediary case is with $V_{d1}=0.6$ V and $V_{d2}=0.5$V. The $I_{total\_fail}$ is 63 and 633 mA for $n_1$ of 1 or 10 respectively.

Figure 13:
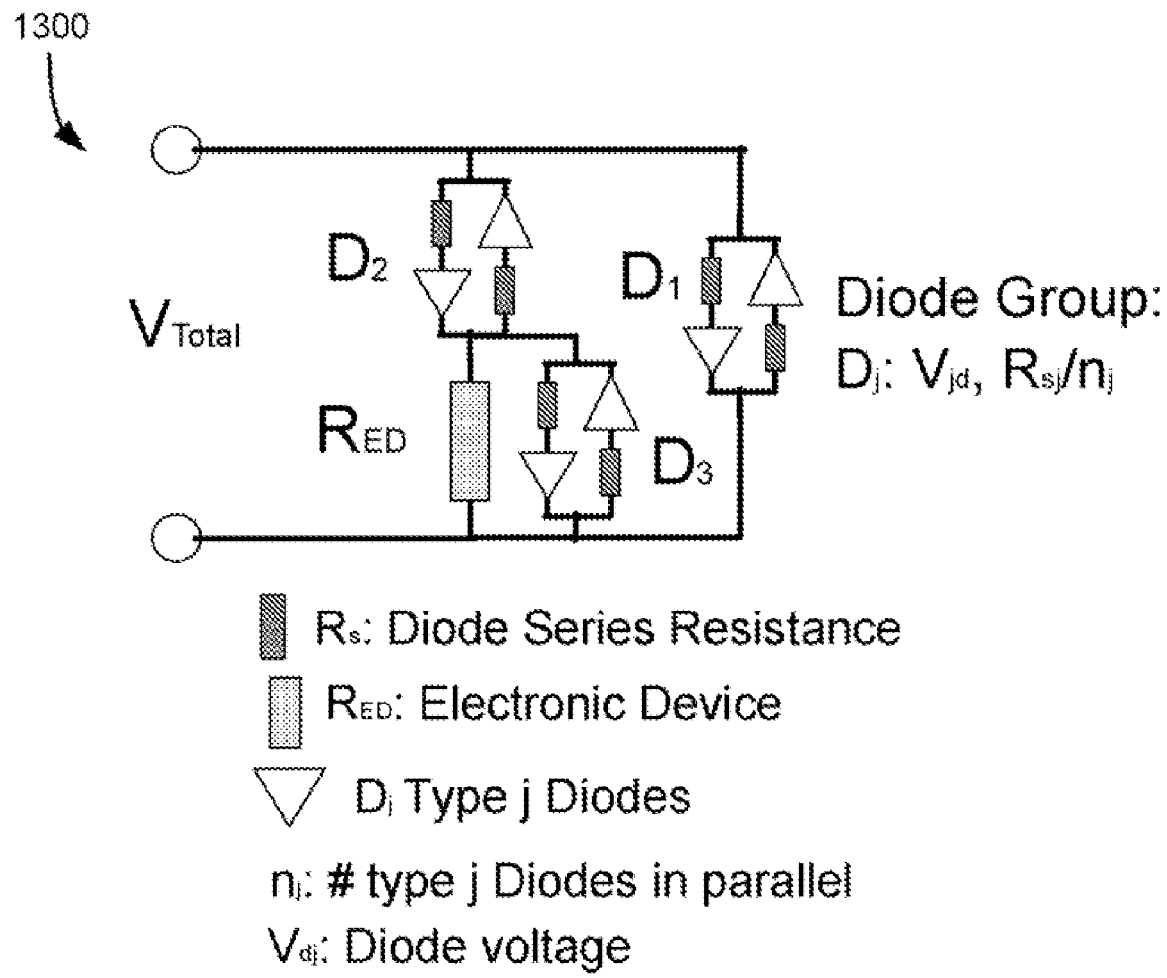
FIG. 13 is a diagram of a system for protecting an electronic device from an electrical event according to one embodiment of the present invention.

More Complex Diode Group Configurations:

Even more protection from ESD damage can be obtained by adding a third diode (or group of diodes) ($D_3$) in parallel with the ED. This embodiment 1300 is seen in FIG. 13. The salient equations for the circuit are:

$$I_{total}=I_1+I_2=I_{ED}+I_3+I_1. \tag{22}$$

$$V_{total}=V_{d2}+I_2[R_{s2}/n_2]+I_{ED}R_{ED}=V_{d1}+I_1(R_{s1}/n_1). \tag{23}$$

$$I_{ED}R_{ED}=V_{d3}+I_3(R_{s3}/n_3). \tag{24}$$

$V_{dj}$ are the ideal diode voltages, $R_{sj}$ are the on resistances of the individual diodes in group $D_j$. $I_j(=n_j I_{dj})$ is the total current through diode group $D_j$. Combining equations 19, 20 and 21 yields a current through $I_{ED}$ of:

$$I_{ED}=[R_1 I_{total}+V_{d1}-V_{d2}]+[(R_1+R_2)/R_3]V_{d3}]/[R_{ED}[(R_1+R_2+R_3)+R_1+R_2], \tag{25}$$

Where $R_j$ is given by the parallel combination of $n_j$ resistors of value $R_{sj}$;

$$R_j=R_{s1}/n_1 \tag{26}$$

For $R_{ED}>>R_1, R_2$ or $R_3$, $$I_{ED} \sim [R_3/[R_1+R_2+R_3]][R_1/R_{ED}]I_{total}+[V_{d1}+[(R_1+R_2)/R_3]V_{d3}]-V_{d2}][R_3/[R_1+R_2+R_3]]/R_{ED}. \tag{27}$$

Taking $V_{d2}=V_{d3}$ and setting them equal to $\sim V_{d1}/2$, and having $R_{s1}=R_{s2}=R_{s3}$, and $n_1=n_2=n_3$, will yield: $I_2 \sim I_{total}/3$, $I_1 \sim [2/3]I_{total}$, and $I_{ED}=[1.5V_{d1}/R_{ED}]+I_{total}[R_{s3}/[3n_3 R_{ED}]]$. The offset term is 50% ($V_{d1}/2R_{ED}$) of the value for a single shunting diode group $D_1$, and the slope of $I_{ED}$ versus $I_{total}$ is ⅓, which is significant. All of the diodes have significance, and the effect of the $n_j$ parallel diodes is also felt. As a specific example of the level of protection, using 0.3 V for $V_{d3}$, an $n_j$ of 10, an $R_{sj}$ of 5 ω and an $R_{ED}$ of 30 ω, then a failure current of $I_{ED}=15$ mA would occur when $I_{total}$ is 900 mA, or a 60 fold increase in the current over no protection. Note also that the voltage would only be 0.45 V across the ED ([15 mA][30 ohm]).

Referring to FIG. 12B, during normal operation (normal "in use" function), the diode(s) $D_2$ should be conducting ("on") while diode(s) $D_1$ should be in the non-conducting state. The larger the value of $\Delta V_d$, $(=V_{d1}-V_{d2})$, the lower the leakage current through $D_1$ during operation, but the less the protection, if a ED (TMR, GMR, AMR, ...) yields a very

TABLE 2

$I_{total\_fail}$ for $R_{ED}$ = 32 Ω and $I_{fail\_ED}$ = 15 mA.

| | $V_{d1}$ (V) | | | | | |
|---|---|---|---|---|---|---|
| | 0.3 | 0.6 | 0.4 | 0.6 | 0.6 | 0.3 |
| | $V_{d2}$ (V) | | | | | |
| | 0 | 0.4 | 0.2 | 0.5 | 0.6 | 0.3 |
| $n_1$ (#) | $I_{total\_fail}$ (mA) | $I_{total\_fail}$ (mA) | $I_{total\_fail}$ (mA) | $I_{total\_fail}$ (mA) | $I_{total\_fail}$ (mA) | $I_{total\_fail}$ (mA) |
| 1 | 30 | 47 | 47 | 63 | 80 | 80 |
| 2 | 60 | 93 | 93 | 127 | 160 | 160 |
| 4 | 120 | 187 | 187 | 253 | 320 | 320 |
| 6 | 180 | 280 | 280 | 380 | 480 | 480 |
| 8 | 240 | 373 | 373 | 507 | 640 | 640 |
| 10 | 300 | 467 | 467 | 633 | 800 | 800 | large signal response, but the device is very sensitive to ESD/EOS damage, one may choose to accept substantial leakage current during operation by making $\Delta V_d$ small to maximize the protection.

The equations described so far are highly non-linear, and can only be solved in the intermediate current regimes either graphically or iteratively. Equations 1-3 describe the IV relationship for an ideal diode, with $I_{d2}$ and $V_{d2}$ (in Equation 1, V is replaced by $V_{d2}$) being the current through and the voltage across the ideal portion of the diode. Combining Equations 1-3 with 21 and 22, the solutions can be solved iteratively and/or graphically. As long as the voltages are chosen appropriately, the leakage current can be minimized. The equations are difficult to interpret without the actual values of $q_j$, $V_{oj}$, $V_{gj}(T)$ and $I_{oaj}(T)$ (j is 1, 2 or 3 for $D_j$) for the diode. Choosing a value of 2 for $q_2$, the leakage current drops a factor of ~10 for every 0.1 V decrease in $V_{bias}$.

Graphical Representation of Paths $D_1$ and $D_2$

In the high current limit, when all diodes are on, most of the current flows around the ED, through $D_1$ and $D_3$. In normal operation, it is desirable to have the majority of the current flow through the ED. Below we will discuss the cases of normal operation, or "low" current conditions. The diode protection scheme is the one depicted in FIG. 12B with both diode groups $D_1$ and $D_2$. The relative operation points are then determined graphically. For $D_1$, an ideal diode (Equations 1-3) is used for $V_{d1}$ with a series resistance given by $R_{s1}/n_1$. The $D_1$/DE current path is given by an ideal diode for $V_{d1}$ with a series resistance given by $R_{s2}/n_2$ and a resistor $R_{DE}$. The IV curve for each current path is determined separately and plotted $I_1$ vs V and $I_{DE}$ vs V. The relative currents $I_1(V)$ and $I_{DE}(V)$ are then determined graphically.

Figure 18A:
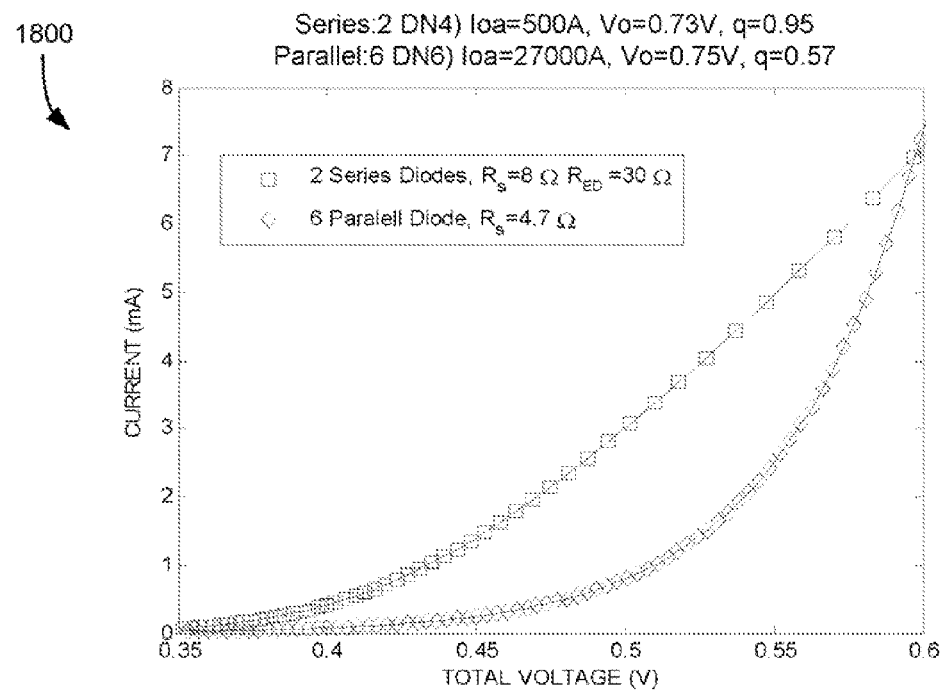
FIG. 18A is an IV curve of an ED with an $R_{ED}$=30 ω and diode protection circuitry comprising of system $D_2$ in series with the ED, and a diode system $D_1$ in parallel with the element formed of $D_2$ and ED. The IV spans the potential IV operating range of the ED.
Figure 18B:
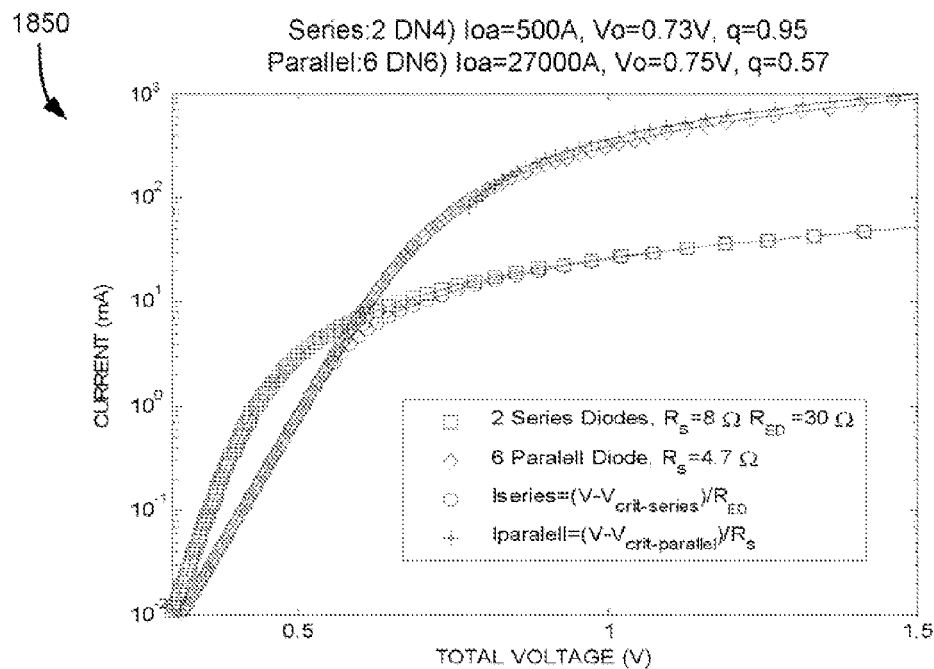
FIG. 18B is an IV curve of a ED with an $R_{ED}$=30 ω and diode protection circuitry comprising of system $D_2$ in series with the ED, and a diode system $D_1$ in parallel with the element formed of $D_2$ and ED. The IV extends beyond the normal operating currents into the high current regime.

FIG. 18A illustrates an IV curve 1800 for $D_2$ in series with an $R_{ED}$ of 30 ω and a diode group $D_1$ which is attached in parallel with $D_2$ and ED. $D_2$ is 2 DN4 diodes and $D_1$ is 6 DN6 diodes from KOA Speer Electronics. The low current region is depicted, where $D_2$ is conductive and $D_1$ is less conductive. FIG. 18B depicts an IV curve 1850 including the high current regime where substantially more current flows through $D_1$ than through $D_2$ and the ED. In operation at 2 and 5 mA, the leakage current through $D_1$ is 0.4 and 2.5 mA respectively, or 17 and 33% of the total current, or a loss in signal of 17 to 33% for these operating points compared to the situation when no diodes are used and the total current flows through the ED. Note that the analytical expression was plotted only for $V-V_{crit}>0.1$ V, and that it is a good approximation for the high current limit. Taking 20 mA as the failure point for current through the ED ($I_{fail\_ED}$), when $I_{fail\_ED}$ reaches 20 mA, the total current (through $D_1$ and $R_{ED}$) is ~200 mA, or a factor of 10 fold increase from no diodes. Thus, though signal is lost in normal operation due to the shunting diodes $D_1$ and the addition of $D_2$, the addition of the diodes $D_1$ and $D_2$ serve as protection against ESD damage.

Figure 19A:
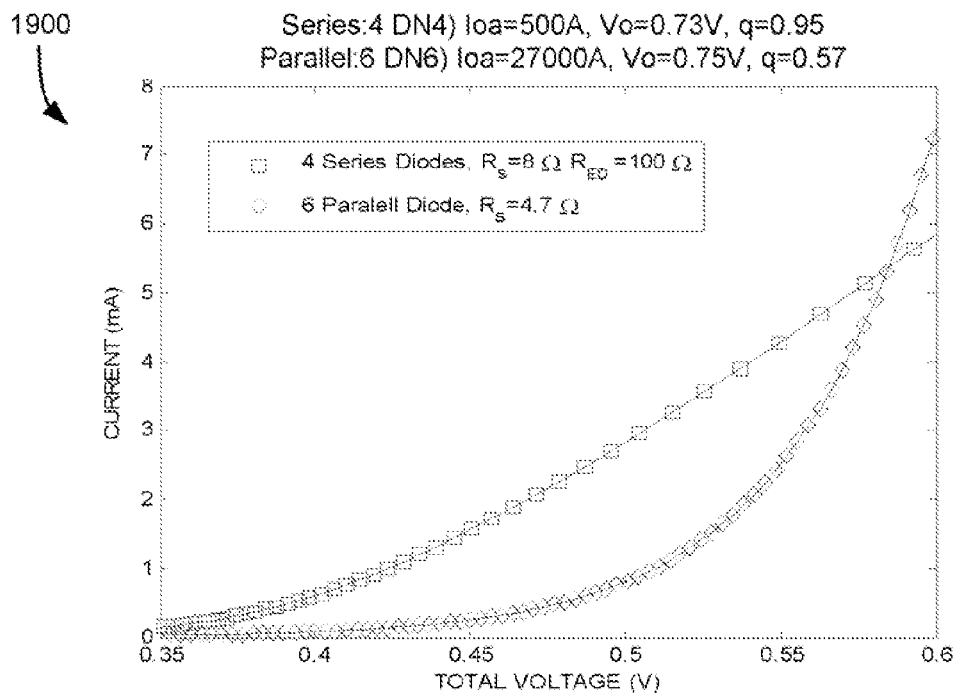
FIG. 19A is an IV curve of a ED with an $R_{ED}$=100 ω and diode protection circuitry comprising of system $D_2$ in series with the ED, and a diode system $D_1$ in parallel with the element formed of $D_2$ and ED. The IV spans the potential IV operating range of the ED.
Figure 19B:
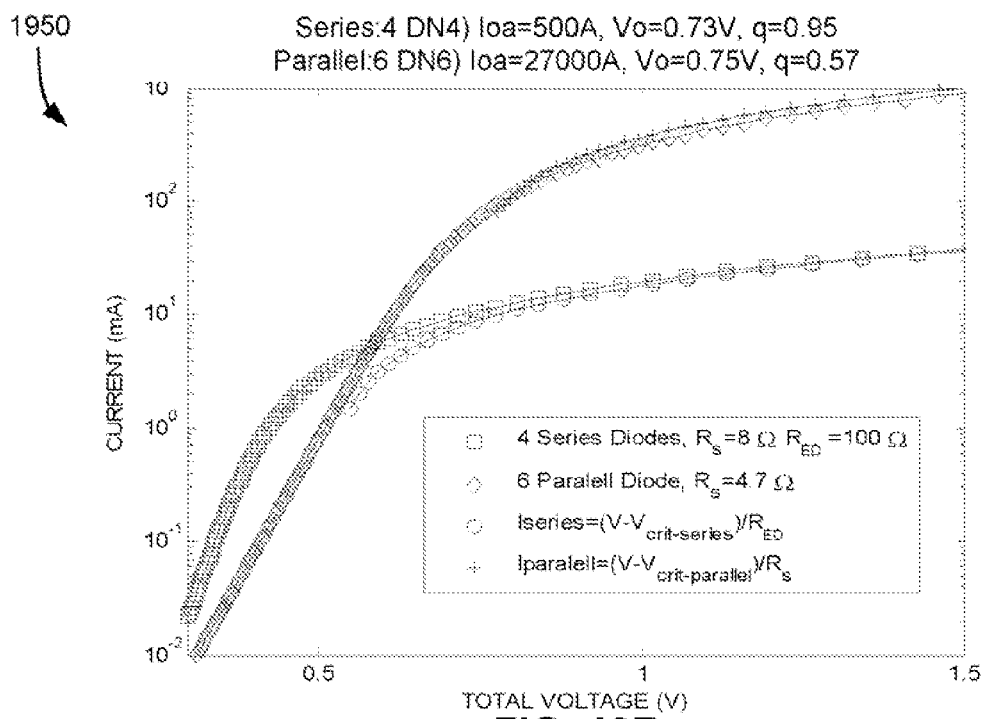
FIG. 19B is an IV curve of a ED with an $R_{ED}$=100 ω and diode protection circuitry comprising of system $D_2$ in series with the ED, and a diode system $D_1$ in parallel with the element formed of $D_2$ and ED. The IV extends beyond the normal operating currents into the high current regime.

FIG. 19A and FIG. 19B are IV curves 1900 and 1950 for $D_2$ in series with $R_{ED}=100$ ω and a diode $D_1$ in parallel with $D_2$ & ED. $D_1$ is 6 DN6 diodes and $D_2$ is 4 DN4 diodes from KOA Speer Electronics. FIG. 19A depicts the Low current region where $D_2$ is conductive and $D_1$ is less conductive. FIG. 19B extends into the high current regime where more current flows through $D_1$ than through $D_2$. In operation at 2 and 5 mA, the leakage current through $D_1$ is 0.3 and 3.3 mA respectively or 23 and 40% of the total current. Note that the analytical expression is plotted only for $V-V_{crit}>0.1$ V, and that it is a good approximation for the high current limit. Taking 20 mA as the failure point, the total current (through $D_1$ and $R_{ED}$) is ~400 mA, or a factor of 20 fold increase from no diodes.

Figure 20A:
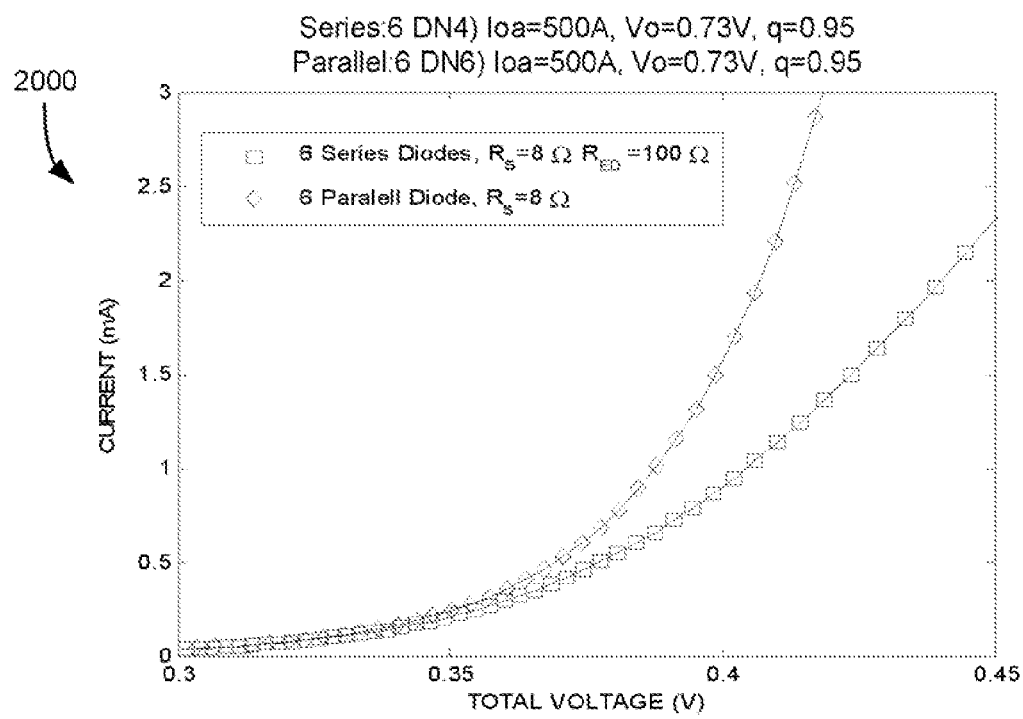
FIG. 20A is an IV curve of a ED with an $R_{ED}$=30 ω and diode protection circuitry comprising of system $D_2$ in series with the ED, and a diode system $D_1$ in parallel with the element comprised of $D_2$ and ED, where $D_1$ and $D_2$ are identical. The IV spans the potential IV operating range of the ED.
Figure 20B:
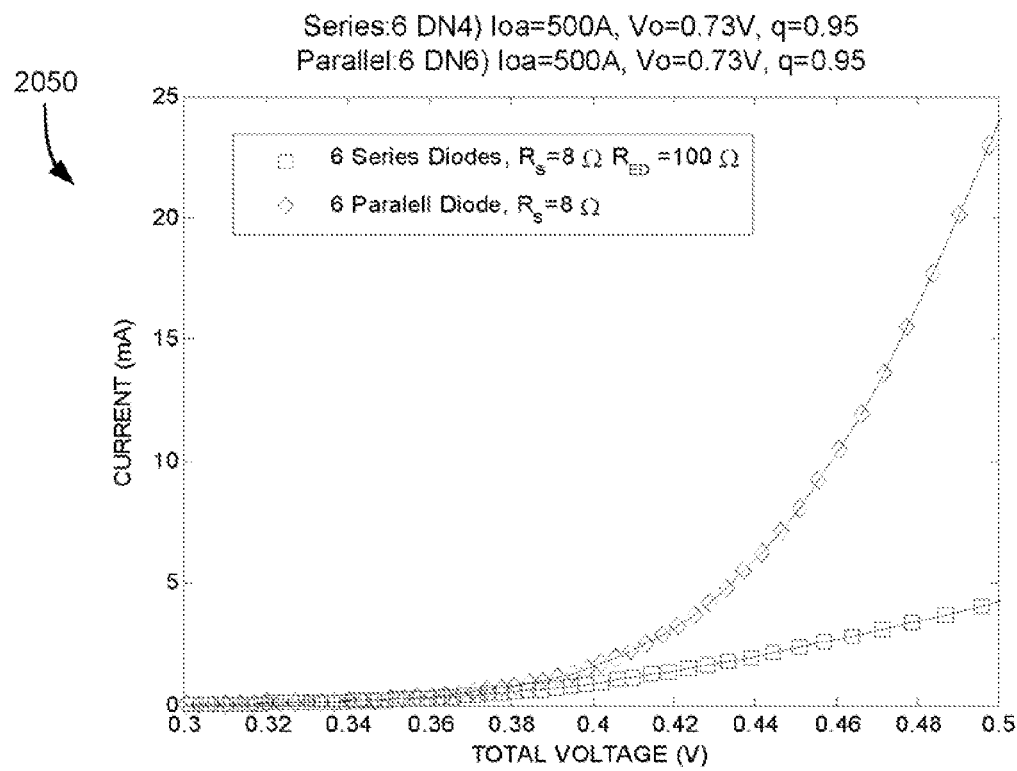
FIG. 20B is an IV curve of a ED with an $R_{ED}$=30 ω and diode protection circuitry comprising of system $D_2$ in series with the ED, and a diode system $D_1$ in parallel with the element comprised of $D_2$ and ED, where $D_1$ and $D_2$ are identical. The IV extends beyond the normal operating currents and into the high current regime.

FIGS. 20A and 20B are IV curves 2000, 2050 for diodes $D_2$ in series with $R_{ED}$ and diodes $D_1$ in parallel with $D_2$ & ED ($R_{ED}=100$ ω) for (FIG. 20A) low current range (below 3 mA), and (FIG. 20B) for higher current, range up to about 30 mA total, (and maximum voltage of 0.5 V). Both $D_1$ and $D_2$ use the same diodes, which have parameters of: $I_{d1o}=I_{d2o}=500$ mA, $V_{d1}=V_{d2}=0.73$ V, $q_1=q_2=0.95$ and $R_{s1}=R_{s2}=8$ ω. 6 diodes are used for $D_1$ and 6 diodes are used for $D_2$. With no protection, the ED would reach 0.5 V with only 5 mA of current. With these given diodes, the failure current will be 28 mA, for an increase in the protection factor by 5.6 times. The trade off is the loss of signal during operation. For TMRs, the operating points are usually less than 0.5 mA. At 0.5 mA through the ED, about 0.7 mA flows through the shunting diodes, or a loss in signal of about 60% through the shunting diodes. For currents through the ED of below 0.5 mA, the ratio increases to a maximum of 50% of the total current, at about 0.1 mA and below.

The IV and RV curves shown in FIGS. 18A through 20B are conceptual examples only. The choice of the diode characteristics and the number of diodes used for a product is determined by the trade-off between loss of signal during normal operation with leakage through $D_1$, versus protection against ESD events in the high current regime, where it is desirable to have more current flowing through $D_1$ than through $D_2$. Detailed knowledge of the ED RV curve, failure current and operating current, as well as the diode characteristics should be known to properly design the circuit.

Figure 25:
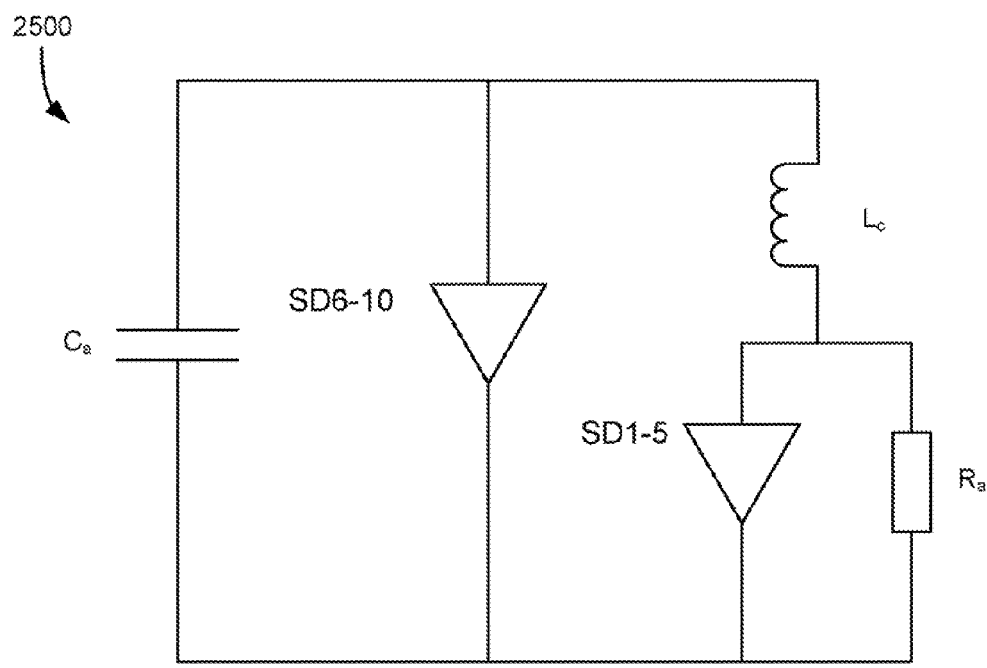
FIG. 25 is a schematic of a system with diodes in two locations on a circuit.

Effect of Physical Location of Diodes on a Cable on Protection Against Damage by ESD:

FIG. 25 illustrates a simplified version of a circuit of FIG. 23, and is included to illustrate an example of positioning diodes on proximal and distal locations of a cable. Following Is a description of simulations showing the effect of placing diodes at different, locations on or in relation to a cable.

Simulations were done looking at the effect of diodes at different locations on a cable containing a device to be protected. The circuit shown in FIG. 23 was used for the simulations. Simulations were done with 1 or 5 diodes (SD1 to SD5) located near the 150 ω device, and 0, 1 or 5 diodes at the front end of the cable. The cable has a 30 nH inductance and the source is a 200 pF capacitor. Adding more diodes improved the protection in all cases. Placing 5 parallel diodes at the end of the cable (Location 1) dropped the current through the sensor from 8.8 mA to 4.9 mA and the voltage across the device from 1.33 to 0.75 V. Placing diodes at the front of the sensor (Location 1) as well as at the end of the cable further reduced the voltage across and the current through the sensor. With 5 diodes at Location 1 and 1 or 5 diodes at Location 2, the current through the sensor was either 4.2 or 4.1 mA respectively. Table 3 summarizes the results. Note that the addition of diodes at both ends of the cable shortens the pulse width ($PW_{50}$). For AMR and GMR sensors, the damage is associated with heating the stripes. The shorter the pulse width, the less the energy deposited into the device ($PW_{50}*I_{peak}*V_{peak}$), and thus the higher the protection. The effect of the external inductor Lc (FIG. 23) was also tested. The larger Lc, the wider the $PW_{50}$. For the case where SD1 to SD10 were all in the circuit, the $PW_{50}$ was: 2.7, 5.2, 6.9, 8.2, 9.2, 10.4 and 13.8 ns when Lc was 1, 10, 20, 30, 40, 50 and 100 nH.

TABLE 3

Results of simulations with 1 or 5 diodes (SD1 to SD5) located near the 150 Ω device, and 0, 1 or 5 diodes (SD6 to SD10) at the front end of the cable. The cable has a 30 nH inductance and the source is a 200 pF capacitor charged to 2 V. The external (source) inductance is taken to be 1 nH in this case (essentially zero)

| Diodes in Circuit | Diodes SD1-SD5 (#) | Diodes SD6-SD10 (#) | $R_{d1}$ (Ω) | $I_{peak}$ (R1) (mA) | $V_{peak}$ (R1) (V) | Sum of peak currents SD1-SD5 (mA) | Sum of peak currents SD6-SD10 (mA) | Diode $PW_{50}$ (ns) | R1 $PW_{50}$ (ns) |
|---|---|---|---|---|---|---|---|---|---|
| None | 0 | 0 | NA | | | | | | |
| SD1 | 1 | 0 | 10 | 8.8 | 1.33 | 59.7 | 0 | 8 | 8 |
| SD1 to SD5 | 5 | 0 | 10 | 5.9 | 0.88 | 93.4 | 0 | 7.6 | 7.6 |
| SD1 | 1 | 0 | 1.5 | 6.2 | 0.89 | 89.3 | 0 | 8 | 8 |
| SD1 to SD5 | 5 | 0 | 1.5 | 4.9 | 0.75 | 104.7 | 0 | 7.6 | 7.6 |
| SD1 & SD6 | 1 | 1 | 10 | 7 | 1.07 | 33.2 | 117 | 1.2 | ≦7 |
| SD1 to SD10 | 5 | 1 | 10 | 5.2 | 0.77 | 52.6 | 117 | 1.2 | ≦7 |
| SD1 & SD6 | 1 | 1 | 1.5 | 4.8 | 0.72 | 22 | 350 | 0.9 | ≦5 |
| SD1 to SD10 | 5 | 1 | 1.5 | 4.2 | 0.64 | 27 | 350 | 0.9 | ≦5 |
| SD1 & SD6 | 1 | 5 | 10 | 5.7 | .85 | 18 | 340 | 1 | ≦5 |
| SD1 to SD10 | 5 | 5 | 10 | 4.4 | 0.64 | 26 | 340 | 1 | ≦5 |
| SD1 & SD6 | 1 | 5 | 1.5 | 4.7 | 0.69 | 17.8 | 519 | 1 | ≦2 |
| SD1 to SD10 | 5 | 5 | 1.5 | 4.1 | 0.6 | 22.9 | 519 | 1 | ≦2 |

Figure 26:
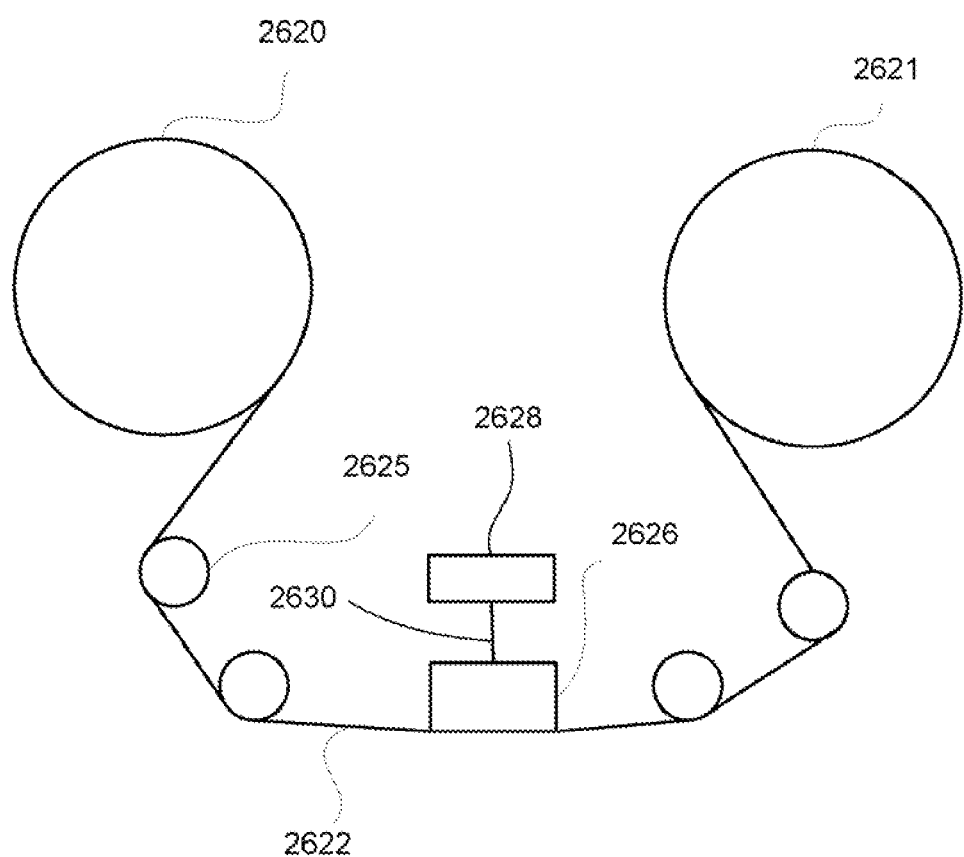
FIG. 26 illustrates a tape drive which may be employed in the context of the present invention.

General Tape Drive:

FIG. 26 illustrates a tape drive in which the protective device(s) described herein may be employed. As shown, a tape supply cartridge 2620 and a take-up reel 2621 are provided to support a tape 2622. Moreover, guides 2625 guide the tape 2622 across a bidirectional tape head 2626. Such bidirectional tape head 2626 is in turn coupled to a control assembly 2628 via a compression-type MR connector cable 2630.

A tape drive, such as that illustrated in FIG. 26, includes drive motor(s) to drive the tape supply cartridge 2620 and the take-up reel 2621 to move the tape 2622 linearly over the head 2626. The tape drive also includes a read/write channel to transmit data to the head 2626 to be recorded on the tape 2622 and to receive data read by the head 2626 from the tape 2622. An interface is also provided for communication between the tape drive and a host to send and receive the data and for controlling the operation of the tape drive and communicating the status of the tape drive to the host, all as understood by those of skill in the art Those skilled in the art will appreciate that the characteristics, configurations and properties of the components and sub-systems of the various embodiments may be applied to any of the embodiments disclosed herein.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system for protecting an electronic device from an electrical event, comprising:
    first and second leads adapted for passing an electric current through an electronic device;
    a second diode protection mechanism coupled in series with the electronic device when the leads are coupled to the electronic device; and
    a first diode protection mechanism coupled to the leads such that the first diode protection mechanism is connected in parallel with the electronic device and the second diode protection mechanism when the leads are coupled to the electronic device,
    wherein at least one of the diode protection mechanisms contains multiple sets of diodes, the sets of diodes in the at least one of the diode protection mechanisms being arranged in parallel with one another, each set of diodes comprising at least two diodes.

2. A system as recited in claim 1, wherein at least one of the diode protection mechanisms includes crossed diodes, wherein the first diode protection mechanism does not traverse any diode coupled in series with the electronic device prior to reaching the leads to which the electronic device is connected.

3. A system as recited in claim 1, wherein both the first and second diode protection mechanisms include multiple sets of crossed diodes arranged in parallel with each other.

4. A system as recited in claim 1, wherein the diode protection mechanisms have nominally a same current versus voltage characteristics.

5. A system as recited in claim 1, wherein the second diode protection mechanism has a different current versus voltage characteristics than the first diode protection mechanism.

6. A system as recited in claim 1, wherein a number of diodes in the first diode protection mechanism is different than a number of diodes in the second diode protection mechanism.

7. A system as recited in claim 1, wherein the properties of the diode protection mechanisms are such that more current flows through the electronic device and the second diode protection mechanism when a current or voltage in an operating range is passing through the leads, and more current flows through the first diode protection mechanism when a current or voltage higher than the operating range is passing through the leads.

8. A system as recited in claim 1, wherein the electronic device is a magnetic sensor selected from a group consisting of a magnetoresistive sensor, a giant magnetoresistive sensor and a magnetic tunnel junction sensor.

9. A system as recited in claim 1, further comprising multiple sets of first and second diode protection mechanisms, each set of first and second diode protection mechanisms being associated with a particular one of a plurality of electronic devices.

10. A system as recited in claim 1, wherein the system is embodied on at least one of a cable and a common substrate with the electronic device.

11. A system for protecting a sensor element of a magnetic head from an electrical event, comprising:
   first and second leads adapted for passing an electric current through a sensor element of a magnetic head;
   a first diode protection mechanism coupled to the leads such that the first diode protection mechanism is connected in parallel with the sensor element when the leads are coupled to the sensor element; and
   a second diode protection mechanism coupled to the leads such that the second diode protection mechanism is connected in parallel with the sensor element and coupled to the leads at a position farther from the sensor element than where the first diode protection mechanism is coupled to the leads when the leads are coupled to the sensor element, the second diode protection mechanism being for reducing a pulse width of an electrical event.

12. A system as recited in claim 11, wherein at least one of the diode protection mechanisms includes at least two diodes connected in parallel with one another and in opposite current polarities, and wherein the second diode protection mechanism is positioned towards a distal end of a cable, the sensor element being coupled to the cable towards a proximal end of the cable.

13. A system as recited in claim 11, wherein at least one of the diode protection mechanisms contains multiple sets of diodes, the sets of diodes in a given diode protection mechanism being arranged in parallel.

14. A system as recited in claim 11, further comprising a third diode protection mechanism coupled in series with the sensor element when the leads are coupled to the sensor element.

15. A system for protecting sensor element of a magnetic head from an electrical event, comprising:
   first and second leads adapted for passing an electric current through a sensor element;
   a first diode protection mechanism coupled to the leads such that the first diode protection mechanism is connected in parallel with the sensor element when the leads are coupled to the sensor element; and
   a resistor mechanism coupled in series with the sensor element, wherein the leads are in a cable, the first diode protection mechanism being coupled directly to the leads in the cable.

16. A system as recited in claim 15, further comprising a second diode protection mechanism coupled in series with the resistor mechanism and the sensor element when the leads are coupled to the sensor element.

17. A system as recited in claim 15, wherein the sensor element is a magnetic tunnel junction sensor or a giant magnetoresistive sensor.

18. A system as recited in claim 15, wherein the first diode protection mechanism is coupled to the leads such that the first diode protection mechanism is connected in parallel with the resistor mechanism and the sensor element when the leads are coupled to the sensor element.

19. A system as recited in claim 15, wherein the system is embodied on a chip coupled to the cable.

20. A method for selecting diode protection mechanisms for protecting a sensor element of a magnetic head from an electrical event the method comprising;
   selecting a first diode protection mechanism for connection directly in parallel with the sensor element; and
   selecting a second diode protection mechanism for connection in series with the sensor element;
   wherein the diode protection mechanisms are selected such that more current flows through the sensor element and the second diode protection mechanism when a current or voltage in an operating range is applied to leads of the sensor element, and more current flows through the first diode protection mechanism when a current or voltage higher than the operating range is applied to either of the leads of the sensor element.

* * * * *